United States Patent
Yano et al.

(10) Patent No.: US 8,449,856 B2
(45) Date of Patent: May 28, 2013

(54) MESOPOROUS SILICA PARTICLES

(75) Inventors: Toshihiro Yano, Wakayama (JP); Takuya Sawada, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/241,707

(22) Filed: Sep. 23, 2011

(65) Prior Publication Data

US 2012/0045646 A1    Feb. 23, 2012

Related U.S. Application Data

(62) Division of application No. 12/447,473, filed as application No. PCT/JP2007/070085 on Oct. 15, 2007, now Pat. No. 8,048,394.

(30) Foreign Application Priority Data

Oct. 31, 2006  (JP) .................................. 2006-295958
Dec. 14, 2006  (JP) .................................. 2006-337561
Jan. 22, 2007  (JP) .................................. 2007-011776

(51) Int. Cl.
    *C01B 33/12* (2006.01)
(52) U.S. Cl.
    USPC ......................................................... 423/335
(58) Field of Classification Search
    USPC .................. 423/348–350, 335–340; 977/773, 977/775, 776; 428/34.4, 358, 402
    See application file for complete search history.

(56) References Cited

U.S. PATENT DOCUMENTS

| 5,196,384 | A | * | 3/1993 | Kamezaki et al. ............... 501/32 |
| 5,512,094 | A | * | 4/1996 | Linton ........................... 106/409 |
| 5,922,299 | A | | 7/1999 | Bruinsma et al. |
| 6,174,512 | B1 | | 1/2001 | Kosuge et al. |
| 6,221,326 | B1 | | 4/2001 | Amiche |
| 2004/0219360 | A1 | * | 11/2004 | Walt et al. ...................... 428/402 |
| 2005/0244322 | A1 | | 11/2005 | Chen et al. |
| 2007/0036705 | A1 | | 2/2007 | Butts et al. |
| 2009/0142522 | A1 | * | 6/2009 | Alivisatos et al. ........... 428/34.1 |

FOREIGN PATENT DOCUMENTS

| JP | 11-278825 | 10/1999 |
| JP | 2006-102592 | 4/2006 |

OTHER PUBLICATIONS

Zhu et al., "A facile method to synthesize novel hollow mesoporous silica spheres and advanced storage property", Microporous and Mesoporous Materials 84 (2005) 218-222.*

Japanese Office Action issued Apr. 3, 2012 in Patent Application No. 2006-337561 with English Translation.

(Continued)

*Primary Examiner* — Anthony J Zimmer
(74) *Attorney, Agent, or Firm* — Oblon, Spivak, McClelland, Maier & Neustadt, L.L.P.

(57) ABSTRACT

The present invention relates to (1) hollow silica particles including an outer shell portion having a mesoporous structure with an average pore size of from 1 to 10 nm, wherein the silica particles have an average particle diameter of from 0.05 to 10 μm, and 80% or more of the whole silica particles have a particle diameter falling within the range of ±30% of the average particle diameter; (2) composite silica particles including silica particles which include an outer shell portion having a mesoporous structure with an average pore size of from 1 to 10 nm, and have a BET specific surface area of 100 $m^2/g$ or more, and a hydrophobic organic compound or a polymeric organic compound incorporated inside of the silica particles; and a process for producing the hollow silica particles.

11 Claims, 4 Drawing Sheets

OTHER PUBLICATIONS

Japanese Office Action issued Apr. 3, 2012 in Patent Application No. 2006-295958 with English Translation.
Office Action issued on Jan. 30, 2011 in the corresponding Chinese Patent Application No. 200780040531.1 (English Translation only).
Zhu et al, J. Am. Chem. Soc., vol. 123, No. 31, pp. 7723-7724 (2001).
Zhu et al, Microporous and Mesoporous Materials, vol. 84, pp. 218-222 (2005).
Qi et al, Chem. Mater. vol. 10, pp. 1623-1626 (1998).
Zhu et al, Nanotechnology, vol. 16, pp. 2633-2638 (2005).
Caruso et al, Science, vol. 282, Nov. 6, 1998.
U.S. Appl. No. 13/516,929, filed Jun. 18, 2012, Yano, et al.

* cited by examiner

MESOPOROUS SILICA PARTICLES

FIELD OF THE INVENTION

The present invention relates to hollow silica particles having an outer shell portion of a mesoporous structure, composite silica particles having an outer shell portion of a mesoporous structure and containing an organic compound, and a process for producing the hollow silica particles.

BACKGROUND OF THE INVENTION

Since materials with a porous structure have a large surface area, they have been extensively used as a carrier for catalysts and a carrier for fixedly supporting enzymes or functional organic compounds thereon. In particular, the materials with a porous structure having a sharp pore size distribution exhibit a function as a molecular sieve and are therefore usable in the applications such as a carrier for catalysts having a structural selectivity or a separating agent for various materials. In such applications, there is a demand for porous materials having uniform and fine pores.

As the porous materials having uniform and fine pores, mesoporous silica having meso-order pores has been developed. It has been noticed that the mesoporous silica is used in the applications such as nanowires, semiconductors and optical electronics in addition to those described previously.

As the silica having a mesoporous structure, there are known silica particles having an outer shell of a mesoporous structure and a hollow inside portion. For example, Patent Document 1 discloses a process for producing a hollow silica microcapsule having a mesoporous wall in which mesopore-free hollow silica particles produced using emulsified droplets of an organic solvent are subjected to high-temperature heat treatment in the presence of a surfactant to form mesopores therein. It is also described that the mesoporous wall is utilized for encapsulating agricultural chemicals, medicines or drugs, cosmetics, aromatizing agents, etc., therein. However, the makeup tests actually made by the inventors failed to obtain mesoporous silica having a hollow structure, and resulted only in production of a mixture of mesopore-free hollow silica particles, solid silica particles and amorphous mesoporous silica particles having not hollow structure.

Patent Document 2 discloses a composite porous material in the form of mesoporous silica particles containing an organic group in which pores involved in 60% or more of a whole pore volume of the silica particles lie within a range of ±40% of a pore size distribution having a maximum peak. In the process for producing the mesoporous silica particles as described in the Patent Document 2, for example, tetramethoxysilane is used in combination with bis(trimethoxysilyl)methane. However, both these silane materials have high hydrolysis rates which are not largely different from each other, thereby failing to produce hollow particles.

Non-Patent Documents 1 and 2 disclose hollow mesoporous silica particles produced using emulsified droplets of trimethyl benzene. However, since a neutral polymer is used as a mesoporous structure template, the resulting pore structure has a low regularity and a BET specific surface area as low as 430 $m^2/g$.

The Non-Patent Document 2 also discloses the use of the hollow mesoporous silica particles and reported the results of study on diffusion of the silica particles into a dye aqueous solution by preparing silica particles in which dye-containing trimethyl benzene is incorporated. However, mesopores on the surface of the respective silica particles are filled with the neutral copolymer.

Non-Patent Documents 3 and 4 disclose hollow mesoporous silica particles which are synthesized by neutralizing the silica particles with an acid at an early reaction stage to interrupt the particle growth reaction. Therefore, the hollow mesoporous silica particles have a BET specific surface area as relatively high as from 850 to 950 $m^2/g$, but exhibit a broad particle size distribution.

Non-Patent Document 5 discloses hollow mesoporous silica particles formed by irradiating an ultrasonic wave to a reaction solution. Therefore, the hollow mesoporous silica particles have a BET specific surface area as relatively high as 940 $m^2/g$, but exhibit a very broad particle size distribution as well as an amorphous particle shape.

The silicon material used as a raw material in the Non-Patent Documents 1 and 2 is a water glass, whereas the silicon material used in the Non-Patent Documents 3 to 5 is tetraethoxysilane. Therefore, the silica particles produced from these silicon materials fail to have an outer shell containing an organic group.

Patent Document 1: JP 2006-102592A
Patent Document 2: JP 2000-219770A
Non-Patent Document 1: Qianyano Sun, et at, "Adv. Mater.", Vol. 15, p. 1097 (2003)
Non-Patent Document 2: Nicole E. Botterhuis, et al., "Chem. Eur. J.", Vol. 12, p. 1448 (2006)
Non-Patent Document 3: Puyam S. Singh, et al., "Chem. Lett.", p. 101 (1998)
Non-Patent Document 4: Christabel E. Fowler, et at, "Chem. Commun.", p. 2028 (2001)
Non-Patent Document 5: Rohit K. Rana, et at, "Adv. Mater.", Vol. 14, p. 1414 (2002)

SUMMARY OF THE INVENTION

The present invention relates to the following hollow silica particles (1) and composite silica particles (2), as well as a process for producing the hollow silica particles.

(1) Hollow silica particles including an outer shell portion having a mesoporous structure with an average pore size of from 1 to 10 nm, wherein the silica particles have an average particle diameter of from 0.05 to 10 μm, and 80% or more of the whole silica particles have a particle diameter falling within the range of ±30% of the average particle diameter.

(2) Composite silica particles including silica particles which include an outer shell portion having a mesoporous structure with an average pore size of from 1 to 10 nm, and have a BET specific surface area of 100 $m^2/g$ or more, and a hydrophobic organic compound or a polymeric organic compound incorporated inside of the silica particles.

DETAILED DESCRIPTION OF THE INVENTION

Figure 1:
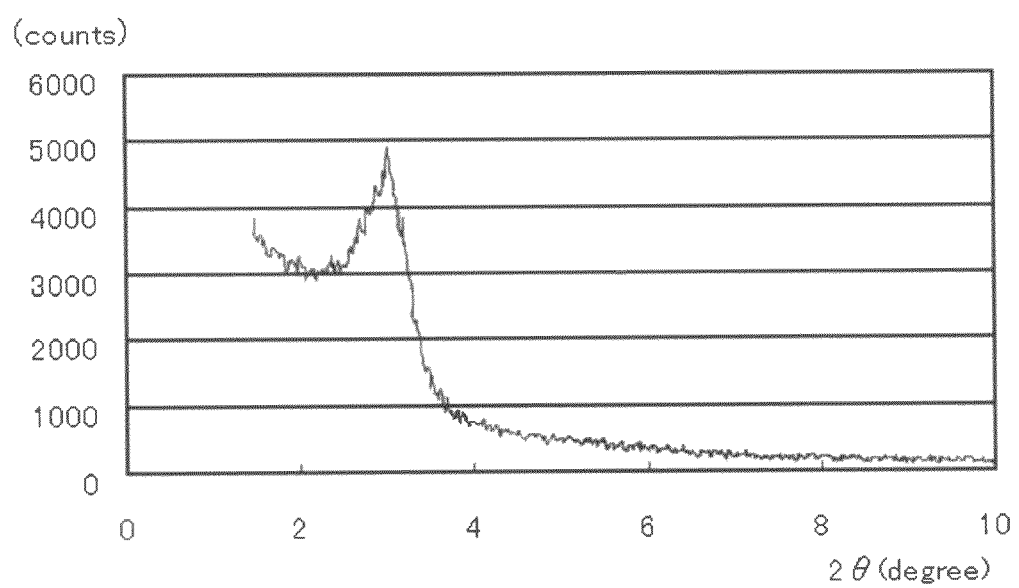
FIG. 1 shows results of XRD measurement of composite silica particles obtained in Example I-1.

The present invention relates to hollow silica particles having an outer shell portion of a mesoporous structure, composite silica particles having an outer shell portion of a mesoporous structure and incorporating a hydrophobic organic compound or a polymeric organic compound therein, and a process for producing the hollow silica particles.

The present inventors have found that hollow silica particles including mesopores in an outer shell portion thereof and exhibiting a uniform particle diameter are obtained by using a hydrophobic organic compound or a polymeric organic compound as a core, or by using combination of two or more kinds of silica sources capable of producing a silanol compound by hydrolysis thereof which are different in hydrolysis rate from each other, upon production of mesoporous silica; and that composite silica particles incorporating the hydrophobic compound or the polymeric organic compound therein are produced in the course of production of the hollow silica particles.

That is, the present invention provides the following aspects (1) to (4):

(1) Hollow silica particles including an outer shell portion having a mesoporous structure with an average pore size of from 1 to 10 nm, wherein the silica particles have an average particle diameter of from 0.05 to 10 μm, and 80% or more of the whole silica particles have a particle diameter falling within the range of ±30% of the average particle diameter.

(2) Composite silica particles including silica particles which include an outer shell portion having a mesoporous structure with an average pore size of from 1 to 10 nm, and have a BET specific surface area of 100 m²/g or more, and a hydrophobic organic compound or a polymeric organic compound incorporated inside of the silica particles.

(3) A process for producing hollow silica particles including an outer shell portion having a mesoporous structure (hereinafter occasionally referred to merely as "production process A"), said process including the following steps (I), (II) and (III):

(I) preparing an aqueous solution containing (a) 0.1 to 100 mmol/L of at least one compound selected from the group consisting of quaternary ammonium salts represented by the following general formulae (1) and (2):

 (1), and

 (2)

wherein $R^1$ and $R^2$ are each independently a linear or branched alkyl group having 4 to 22 carbon atoms; and X is a monovalent anion;
(b) 0.1 to 100 mmol/L of a silica source capable of forming a silanol compound by hydrolysis thereof, (c1) 0.1 to 100 mmol/L of a hydrophobic organic compound or (c2) 0.01 to 10% by mass of a polymeric organic compound; and water;

(II) stirring the aqueous solution prepared in the step (I) at a temperature of 10 to 100° C. to precipitate composite silica particles including silica particles which include an outer shell portion having a mesoporous structure, and the hydrophobic organic compound (c1) or the polymeric organic compound (c2) incorporated inside of the silica particles; and (III) baking the composite silica particles obtained in the step (II).

(4) A process for producing hollow silica particles including an outer shell portion having a mesoporous structure (hereinafter occasionally referred to merely as "production process B"), said process including the following steps (i), (ii) and (iii):

(i) preparing an aqueous solution containing (a) 0.1 to 100 mmol/L of at least one compound selected from the group consisting of quaternary ammonium salts represented by the following general formulae (1) and (2):

 (1), and

 (2)

wherein $R^1$ and $R^2$ are each independently a linear or branched alkyl group having 4 to 22 carbon atoms; and X is a monovalent anion;
and (b') 0.1 to 100 mmol/L of two or more silica sources capable of forming a silanol compound by hydrolysis thereof which are different in hydrolysis rate from each other, at least one of the silica sources including an organic group;

(ii) stirring the aqueous solution prepared in the step (i) at a temperature of 10 to 100° C. to precipitate a composite material including the quaternary ammonium salt and silica; and (iii) subjecting the composite material including the quaternary ammonium salt and silica obtained in the step (ii) to baking or extraction treatment to remove the quaternary ammonium salt from the composite material.

(1) Hollow Silica Particles

The hollow silica particles of the present invention include an outer shell portion having mesopores, and are characterized by a uniform particle diameter, a sharp particle size distribution, and further the hollow silica particles according to a preferred embodiment of the present invention have a large specific surface area.

More specifically, the hollow silica particles of the present invention include an outer shell portion having a mesoporous structure with an average pore size of from 1 to 10 nm, wherein the silica particles have an average particle diameter of from 0.05 to 10 μm, and 80% or more of the whole silica particles have a particle diameter falling within the range of ±30% of the average particle diameter. Meanwhile, as used herein, the hollow silica particles including an outer shell portion having mesopores are occasionally referred to as "hollow mesoporous silica particles" or merely as "hollow silica particles".

The outer shell portion of the respective hollow silica particles of the present invention includes pores having an average pore size of from 1 to 10 nm, preferably from 1 to 8 nm and more preferably from 1 to 5 nm. The configurations of the outer shell portion having a mesoporous structure and the hollow portion inside of the respective silica particles are observed using a transmission electron microscope (TEM) to determine a pore size, a pore regularity and a connecting condition between pores from the outer shell portion toward inside.

The hollow silica particles of the present invention have an average particle diameter of from 0.05 to 10 μm, preferably from 0.05 to 5 μm and more preferably from 0.05 to 3 μm. In particular, in the hollow silica particles having an average particle diameter of from 0.05 to 0.1 μm, the average pore size of mesopores therein is preferably from 1 to 5 nm, whereas in the hollow silica particles having an average particle diameter of from 0.1 to 1 μm, the average pore size of mesopores therein is preferably from 1 to 8 nm. Further, in the hollow silica particles having an average particle diameter of from 1 to 10 μm, the average pore size of mesopores therein is preferably from 1 to 10 nm.

The hollow silica particles of the present invention exhibit such a particle size distribution in which 80% or more, preferably 85% or more, more preferably 90% or more and still more preferably 95% or more of the whole particles have a particle diameter falling within the range of ±30% of the average particle diameter. In addition, the hollow silica particles preferably exhibit a powder X-ray diffraction (XRD) pattern and/or an electron-beam diffraction pattern in which one or more peaks are observed at a diffraction angle corresponding to a range of d=2 to 12 nm.

Meanwhile, the average pore size of mesopores as used herein is determined from a nitrogen adsorption isothermal curve obtained by nitrogen adsorption measurement according to BJH method. Also, the average particle diameter of the hollow silica particles of the present invention may be adjusted by selection of the hydrophobic organic compound or polymeric organic compound, agitation power upon mixing, concentration of reagents used, temperature of a solution, baking conditions, etc.

The hollow silica particles of the present invention preferably have a BET specific surface area of 800 $m^2/g$ or more, more preferably 900 $m^2/g$ or more and still more preferably from 950 to 1500 $m^2/g$.

When observing the hollow silica particles of the present invention by a transmission electron microscope (TEM), it is confirmed that 80% or more, preferably 85% or more and more preferably 90% or more of the whole particles are in the form of hollow particles. As the specific method of measuring the proportion or content of the hollow particles, there may be used a method in which the number of particles including mesopores and having a hollow structure is counted among whole particles observed in a visual field containing 20 to 30 particles under a transmission electron microscope, and the procedure is repeated five times while varying the visual field to obtain an average value thereof.

In the hollow silica particles according to a preferred embodiment of the present invention, an average distance between the mesopores as observed by a transmission electron microscope is consistent with a structural period obtained by powder X-ray diffraction within a tolerance range of ±30%. More specifically, the value obtained by multiplying a distance between centers of the observed mesopores by $\sqrt{3}/2$ is consistent with a spacing between planes corresponding a lowermost angle peak as determined by powder X-ray diffraction within a tolerance range of ±30%. As described above, the hollow silica particles are a substance having a periodicity in a meso-region which exhibits a powder X-ray diffraction pattern in which one or more peaks are observed at a diffraction angle corresponding to a range of d=2 to 12 nm.

In the production method using the hydrophobic organic compound (c1) or the polymeric organic compound (c2) as a core upon production of the hollow silica particles (production process A), the average thickness of the outer shell portion of the respective hollow silica particles when using the hydrophobic organic compound (c1) is preferably from 30 to 700 nm, more preferably from 50 to 500 nm and still more preferably from 70 to 400 nm, whereas the average thickness of the outer shell portion of the respective hollow silica particles when using the polymeric organic compound (c2) is preferably from 10 to 500 nm, more preferably from 20 to 300 nm and still more preferably from 30 to 200 nm.

On the other hand, in the production process using two or more kinds of silica sources that are different in hydrolysis rate from each other (production process B), the average thickness of the outer shell portion of the respective hollow silica particles is preferably from 5 to 3000 nm, more preferably from 10 to 1000 nm and still more preferably from 50 to 800 nm.

In the production process using the hydrophobic organic compound (c1) or the polymeric organic compound (c2) as a core upon production of the hollow silica particles (production process A), the ratio of the thickness of the outer shell portion to the average particle diameter [(thickness of outer shell portion)/(average particle diameter)] is preferably from 0.01 to 0.6, more preferably from 0.05 to 0.5 and still more preferably from 0.1 to 0.4. On the other hand, in the production process using two or more kinds of silica sources that are different in hydrolysis rate from each other (production process B), the ratio of the thickness of the outer shell portion to the average particle diameter [(thickness of outer shell portion)/(average particle diameter)] is preferably from 0.2/100 to 50/100, more preferably from 0.5/100 to 40/100 and still more preferably from 1/100 to 30/100.

Meanwhile, in the present invention, the average particle diameter and extent of distribution thereof as well as the average thickness of the outer shell portion are measured by observation using a transmission electron microscope (TEM). More specifically, diameters of whole particles observed in a visual field containing 20 to 30 particles as well as thicknesses of outer shell portions thereof are actually measured on a microphotograph obtained under observation using a transmission electron microscope. The procedure is repeated five times while varying the visual field. From the obtained data, the average particle diameter and extent of distribution thereof as well as the average thickness of the outer shell portions are calculated. The magnification of the transmission electron microscope is from about 10000 to about 100000 times, and may be appropriately controlled according to the size of the silica particles. However, when the proportion or content of the hollow silica particles having mesopores in whole particles observed in a display is 30% or less, the visual field is extended, namely the magnification of the electron microscope is reduced, to obtain data from at least 10 particles in the extended visual field.

In the production process using the hydrophobic organic compound (c1) or the polymeric organic compound (c2) as a core upon production of the hollow silica particles (production process A) according to the present invention, it is possible to obtain hollow silica particles having a uniform average pore size of mesopores in an outer shell portion thereof and a sharp distribution of the mesopores.

In the hollow silica particles obtained by the production process A, preferably 70% or more, more preferably 75% or more and still more preferably 80% or more of the mesopores thereof fall within the range of ±30% of the average pore size.

The structure of the outer shell portion of the respective hollow silica particles varies depending upon the silica sources used. When using a silica source having an organic group, it is possible to form hollow silica particles including an outer shell portion constructed from a silicon compound having an organic group. The details of the structure of the outer shell portion in the thus obtained hollow silica particles are the same as those mentioned below with respect to the composite silica particles.

The hollow silica particles are obtained by baking the composite silica particles. Although the basic structure of the outer shell portion of the hollow silica particles is substantially identical to that of the composite silica particles, the hydrophobic organic compound or polymeric organic compound and cationic surfactant which are incorporated inside of the composite silica particles are removed therefrom by baking.

The average pore size of the mesopores of the hollow silica particles and extent of distribution thereof, the average particle diameter of the hollow silica particles and extent of distribution thereof, and the thickness of the outer shell portion of the hollow silica particles, may be determined by the same methods as described below with respect to the composite silica particles.

(2) Composite Silica Particles

The composite silica particles of the present invention are obtained by separating the composite silica particles produced in the step (II) of the production process A. In particular, the composite silica particles are obtained by treating the composite silica particles produced in the step (II) with an acid solution to remove the residual quaternary ammonium salt in the mesopores therefrom. In the composite silica particles, the hydrophobic organic compound or polymeric organic compound used as a core in the production process A is included in an outer shell portion thereof having mesopores.

Thus, the composite silica particles of the present invention are mesoporous silica particles constituted from silica particles including an outer shell portion having a mesoporous structure with an average pore size of from 1 to 10 nm which have a BET specific surface area of 100 $m^2$/g or more, and the hydrophobic organic compound or polymeric organic compound incorporated in the silica particles.

The average pore size of pores in the composite silica particles is preferably from 1 to 8 nm and more preferably from 1 to 5 nm. The configurations of the outer shell portion having a mesoporous structure and the inside of the respective particles may be observed using a transmission electron microscope (TEM) to determine the pore size, pore regularity and connecting condition between pores from the outer shell portion toward inside.

One feature of the mesoporous structure of the composite silica particles according to the present invention is a uniform pore size of the mesopores thereof. Usually, 70% or more of the mesopores in the composite silica particles have a pore size falling within the range of ±30% of the average pore size. In the present invention, the average pore size of the mesopores is determined from a nitrogen adsorption isothermal curve prepared by nitrogen adsorption measurement according to BJH method.

The composite silica particles of the present invention preferably have a BET specific surface area of 300 $m^2$/g or more, more preferably 400 $m^2$/g or more and still more preferably 500 $m^2$/g or more.

The average particle diameter of the composite particles of the present invention is preferably from 0.05 to 10 μm, more preferably from 0.05 to 5 μm and still more preferably from 0.05 to 3 μm. When the average particle diameter of the composite silica particles is from 0.05 to 0.1 μm, the average pore size of the mesopores therein is preferably from 1 to 5 nm, whereas when the average particle diameter of the composite silica particles is from 0.1 to 1 μm, the average pore size of the mesopores therein is preferably from 1 to 8 nm. Further, when the average particle diameter of the composite silica particles is from 1 to 10 μm, the average pore size of the mesopores therein is preferably from 1 to 10 nm.

In the composite silica particles according to the present invention, 80% or more, preferably 85% or more, more preferably 90% or more and most preferably 95% or more of the whole particles have a particle diameter falling within the range of ±30% of the average particle diameter, namely, it is preferred that the composite silica particles be constituted from a group of particles having a very uniform particle diameter.

In addition, it is preferred that preferably 75% or more and more preferably 80% or more of the mesopores in the composite silica particles have a pore size falling within the range of ±30% of the average pore size.

Meanwhile, the average particle diameter of the composite silica particles may be adjusted by selection of the cationic surfactant or the hydrophobic organic compound or polymeric organic compound, agitation power upon mixing, concentration of raw materials used, temperature of a solution, etc. In particular, when using the polymeric organic compound, the average particle diameter of the composite silica particles may be adjusted by the particle diameter of the polymeric organic compound. In the composite silica particles as an intermediate product of the hollow silica particles, the cationic surfactant, if used, may remain inside of the composite silica particles, in the mesopores or on the surface of the silica particles during the production process. It is not necessary to remove the residual cationic surfactant unless any problems occur. However, if the removal of the residual cationic surfactant is desirable, the composite silica particles may be subjected to washing treatment with water or an acid aqueous solution to replace the cationic surfactant therewith. By removing the residual cationic surfactant, it is possible to obtain composite silica particles having a large BET specific surface area.

The average thickness of the outer shell portion of the composite silica particles according to the present invention is preferably from 30 to 700 nm, more preferably from 50 to 500 nm and still more preferably from 70 to 400 nm.

The ratio of the thickness of the outer shell portion to the average particle diameter of the composite silica particles [(thickness of outer shell portion)/(average particle diameter)] is preferably from 0.01 to 0.6, more preferably from 0.05 to 0.5 and still more preferably from 0.1 to 0.4.

Meanwhile, in the present invention, the average particle diameter of the composite silica particles and extent of distribution thereof as well as the average thickness of the outer shell portion may be measured in the same manner as described previously with respect to the hollow silica particles.

The structure of the outer shell portion of the composite silica particles varies depending upon the silica sources used. When using the silica source having an organic group, the resulting outer shell portion has a silica structure having the organic group. When adding, in addition to the silica sources, alkoxy salts or halides containing other elements, for example, metals such as Al, Ti, V, Cr, Co, Ni, Cu, Zn, Zr, Mn and Fe and nonmetallic elements such as B, P, N and S during or after production of the composite silica particles, the metals or nonmetallic elements may be present in the outer shell portion of the composite silica particles. From the viewpoint of a good stability of structure of the outer shell portion, it is preferred that the outer shell portion be produced by using tetramethoxysilane or tetraethoxysilane as the silica source, and the silica wall thereof is substantially constituted from silicon oxide.

The composite silica particles of the present invention are a substance having a periodicity in a meso-region which exhibits a powder X-ray diffraction pattern in which one or more peaks are observed at a diffraction angle corresponding to a range of d=2 to 12 nm. Meanwhile, when the regularity becomes high, clear peaks are observed, so that high-order peaks tend to appear.

(2-1) Composite Silica Particles Incorporating Hydrophobic Organic Compound Therein:

The hydrophobic organic compound incorporated in the composite silica particles of the present invention may be kept in a liquid state at a temperature of 0° C. or higher and preferably 20° C. or higher from the viewpoint of forming oil droplets thereof in water upon production of the composite silica particles, and at a temperature of 100° C. or lower and preferably 90° C. or lower from the viewpoint of using water as a dispersing medium. The hydrophobic organic compound preferably has a boiling point of 100° C. or higher.

The hydrophobic organic compound is also preferably kept in a liquid state at its reaction temperature from the viewpoint of facilitated use thereof. The temperature used upon production of the composite silica particles may be determined according to the desired compound to be incorporated therein. In the present invention, there is preferably used such a hydrophobic organic compound which can be kept in a liquid state at 20° C. Meanwhile, when using plural kinds of hydrophobic organic compounds, for example, when using a mixture of a hydrophobic organic compound kept in a liquid state at a higher temperature and that kept in a liquid state at a lower temperature, the temperature for forming oil droplets and the reaction temperature may be determined in view of extent of vaporization thereof.

Meanwhile, the hydrophobic organic compound as used herein means a compound having a low solubility in water and capable of forming a separate phase from water. The hydrophobic organic compound is preferably a compound capable of being dispersed in the presence of the below-mentioned quaternary ammonium salts. Examples of the hydrophobic organic compound include compounds having a Log $P_{ow}$ value of 1 or more and preferably from 2 to 25. The "Log value" as used herein means a 1-octanol/water partition coefficient of a chemical substance, and is expressed by a numerical value calculated according to log $K_{ow}$ method. More specifically, a chemical structure of a compound is separated into constitutional fragments, and hydrophobic fragment constants of the respective fragments are accumulated to obtain the Log P value (refer to Meylan, W. M. and P. H. Howard, 1995, "Atom/fragment contribute on method for estimating octanol-water partition coefficients", J. Pharm. Sci., 84: pp. 83-92).

Examples of the hydrophobic organic compound include hydrocarbon compounds, ester compounds, fatty acids having 6 to 22 carbon atoms, alcohols having 6 to 22 carbon atoms and oil agents such as silicone oils, as well as functional materials such as perfume components, base materials for agricultural chemicals and medical base materials.

Examples of the hydrocarbon compounds include liquid paraffin or liquid petroleum jelly, squarane, squalene, perhydrosqualene, trimethyl benzene, xylene, toluene and benzene. Among these hydrocarbon compounds, preferred are squarane and squalene.

Examples of the ester compounds include oils and fats such as glycerol esters of fatty acids having 6 to 22 carbon atoms. Specific examples of the oils and fats include mink oil, turtle oil, soybean oil, sweet almond oil, beauty leaf oil, palm oil, grape seed oil, sesame seed oil, corn oil, Parleam oil, Arara oil, rape seed oil, sunflower oil, cotton seed oil, apricot oil, castor oil, avocado oil, jojoba oil, olive oil and cereal embryo oil.

Examples of the further ester compounds include condensates of a fatty acid having 4 to 22 carbon atoms and a monohydric alcohol or a polyhydric alcohol other than glycerol having 1 to 22 carbon atoms. Specific examples of the ester compounds include isopropyl myristate, isopropyl palmitate, butyl stearate, hexyl laurate, isononyl isononanoate, 2-ethylhexy palmitate, 2-hexyldecyl laurate, 2-octyldecyl palmitate and 2-octyldodecyl myristate. Examples of the other ester compounds include esters of a polycarboxylic acid compound and an alcohol. Specific examples of the other ester compounds include diisopropyl adipate, 2-octyldodecyl lactate, 2-diethylhexyl succinate, diisostearyl malate, glyceryl triisostearate and diglyceryl triisostearate.

Examples of the fatty acid having 6 to 22 carbon atoms include myristic acid, palmitic acid, stearic acid, behenic acid, oleic acid, linoleic acid, linolenic acid and isostearic acid.

Examples of the alcohol having 6 to 22 carbon atoms include cetanol, stearyl alcohol, oleyl alcohol, linoleyl alcohol, linolenyl alcohol, isostearyl alcohol and octyl dodecanol. Polyhydric alcohols derived from these alcohols may also be used in the present invention.

Examples of the silicone oil include polydimethylsiloxane (PDMS), polysiloxanes modified with fatty acids, fatty alcohols or polyoxyalkylene, fluorosilicones and perfluorosilicone oil.

The polydimethylsiloxane (PDMS) may be a phenylated product such as phenyl trimethicone, or may be optionally substituted with an aliphatic group and/or an aromatic group. These compounds may be in the form of a hydrocarbon-based oil or a silicone oil, and are preferably in the form of a linear or cyclic silicone having 2 to 7 silicon atoms and optionally containing an alkyl group or an alkoxy group which may be present in a pendant form in a silicone chain or at a terminal end thereof. Of these compounds, more preferred are octamethyl cyclotetrasiloxane, decamethyl cyclopentasiloxane, hexadecamethyl cyclohexasiloxane, heptamethylhexyl trisiloxane and heptamethyloctyl trisiloxane.

Among the above oil agents, most preferred are squalene, glycerol esters of fatty acids having 6 to 22 carbon atoms, higher alcohols having 6 to 22 carbon atoms, because these compounds are easily dispersed in water in the presence of the below-mentioned quaternary ammonium salts so that the resulting composite silica particles and hollow silica particles can be provided at an outer shell portion thereof with a mesoporous structure having a high regularity.

Examples of the perfume component as the functional material include natural perfumes and synthetic perfumes. Specific examples of the natural perfumes include spearmint oil, peppermint oil, citronella oil, eucalyptus oil, cascarilla oil, birch oil, cinnamon oil, clove oil, garlic oil, peppermint oil, majoram oil, nutmeg oil, palmarosa oil, perilla oil, rose oil, savory oil, rosemary oil and lavender oil. Specific examples of the synthetic perfumes include amyl acetate, or amylcinnamic aldehyde, isoamyl salicylate, anisaldehyde, benzyl acetate, benzyl alcohol, borneol, l-carvone, menthol, citral, citronellal, citronellol, coumarin, eugenol, methyl salicylate, vanillin and terpineol.

These hydrophobic organic compounds may be used singly or in the form of a mixture of any two or more thereof at any optional proportions. In addition, there may also be used such a hydrophobic organic compound in which a compound incapable of satisfying the above hydrophobic conditions is dissolved. Further, when using the composite silica particles as a carrier for aromatizing agents, there may be used a dilute solution prepared by dissolving the perfume component in the hydrophobic organic compound.

(2-2) Composite Silica Particles Incorporating Polymeric Organic Compound Therein:

The polymeric organic compound incorporated in the composite silica particles of the present invention is a high-molecular weight polymer and preferably at least one polymer selected from the group consisting of a cationic polymer, a nonionic polymer and an amphoteric polymer. As the polymer, a substantially water-insoluble polymer is used.

(2-2-1) Cationic Polymer

The cationic polymer used in the present invention is preferably dispersible in a medium containing an aqueous continuous phase in the form of a polymer emulsion in the presence of a cationic surfactant. The cationic polymer is preferably present in the form of cationic polymer particles obtained by subjecting a monomer mixture containing a cationic monomer, in particular, a cationic group-containing ethylenically unsaturated monomer, to emulsion polymerization in the presence of a cationic surfactant. The cationic polymer used in the present invention contains substantially no anionic group.

Examples of the cationic monomer include an acid-neutralized product of an amino group-containing monomer and a quaternary ammonium salt obtained by quaternerization of the above monomer using a quaternerizing agent.

The amino-group-containing monomer is preferably at lease one compound selected from the group consisting of dialkylamino group-containing (meth)acrylic acid esters and (meth)acrylamides, dialkylamino group-containing styrenes, vinyl pyridines, N-vinyl heterocyclic compounds, amino-group-containing vinyl ethers, and allyl amines. Meanwhile, the term "(meth)acrylic acid" as used herein means "acrylic acid, methacrylic acid or a mixture thereof", and the term "(meth)acrylate" as used herein also means "acrylate, methacrylate or a mixture thereof".

Specific examples of the dialkylamino group-containing (meth)acrylic acid esters include dimethylaminoethyl (meth)acrylate, diethylaminoethyl (meth)acrylate, dipropylaminoethyl (meth)acrylate, diisopropylaminoethyl (meth)acrylate, dibutylaminoethyl (meth)acrylate, diisobutylaminoethyl (meth)acrylate and di-t-butylaminoethyl (meth)acrylate.

Specific examples of the dialkylamino group-containing (meth)acrylamides include dimethylaminopropyl (meth)acrylamide, diethylaminopropyl (meth)acrylamide, dipropylaminopropyl (meth)acrylamide, diisopropylaminopropyl (meth)acrylamide, dibutylaminopropyl (meth)acrylamide, diisobutylaminopropyl (meth)acrylamide and di-t-butylaminopropyl (meth)acrylamide.

Specific examples of the dialkylamino group-containing styrenes include dimethylaminostyrene and dimethylaminomethylstyrene. Specific examples of the vinyl pyridines include 4-vinyl pyridine and 2-vinyl pyridine. Specific examples of the N-vinyl heterocyclic compounds include N-vinyl imidazole. Specific examples of the amino-group-containing vinyl ethers include aminoethyl vinyl ether and dimethylaminoethyl vinyl ether.

Specific examples of the allyl amines include allyl amine, N,N-diallyl amine and N,N-diallyl-N-alkyl amines wherein the alkyl group has 1 to 5 carbon atoms.

The acid-neutralized product of the amino group-containing monomer may be obtained by mixing the above amino group-containing monomer with an acid. Examples of the suitable acid include hydrochloric acid, sulfuric acid, nitric acid, acetic acid, formic acid, maleic acid, fumaric acid, citric acid, tartaric acid, adipic acid, sulfamic acid, toluenesulfonic acid, lactic acid, pyrrolidone-2-carboxylic acid and succinic acid. Alternatively, after producing the cationic polymer by polymerization of the amino group-containing monomer, the resulting cationic polymer may be mixed with the acid-neutralized product.

The quaternary ammonium salt obtained by quaternerization of the amino group-containing monomer using a quaternerizing agent may be obtained by treating the amino group-containing monomer with the quaternerizing agent. Examples of the quaternerizing agent include alkylating agents, e.g., alkyl halides such as methyl chloride, ethyl chloride, methyl bromide and methyl iodide; and dialkyl sulfates such as dimethyl sulfate, diethyl sulfate and di-n-propyl sulfate.

Examples of the diallyl-type quaternary ammonium salts include dimethyldiallyl ammonium chloride and diethyldiallyl ammonium chloride.

Among these cationic monomers, preferred are (meth)acrylic acid esters having a dialkylamino group or a trialkyl ammonium group, and most preferred are (meth)acrylic acid esters having a dialkylamino group or a trialkyl ammonium group.

The cationic polymer used in the present invention contains a constitutional unit derived from the above cationic monomer and preferably contains, in addition to the constitutional unit derived from the above cationic monomer, a constitutional unit derived from a hydrophobic monomer, in particular, from alkyl (meth)acrylates and aromatic ring-containing monomers. Examples of the suitable hydrophobic monomer include alkyl (meth)acrylates containing an alkyl group having 1 to 30 carbon atoms, preferably 3 to 22 carbon atoms and more preferably 3 to 18 carbon atoms, styrene-based monomers such as styrene and 2-methyl styrene, aryl esters of (meth)acrylic acid such as benzyl (meth)acrylate, vinyl monomers containing an aromatic group having 6 to 22 carbon atoms, and vinyl acetate. Among these hydrophobic monomers, most preferred are alkyl (meth)acrylates and styrene.

Meanwhile, the hydrophobic monomer as used herein means a polymerizable organic compound having a low solubility in water which is capable of forming a separate phase from water. The hydrophobic monomer is a compound having a Log $P_{ow}$ value of 0 or more, preferably 0.5 or more but 25 or less. The "Log P" value as used herein is the same as defined previously.

The cationic polymer may contain the constitutional unit derived from the cationic monomer in a small amount. Therefore, almost a majority of the cationic polymer may be formed from the constitutional unit derived from the hydrophobic monomer. The total content of the constitutional unit derived from the cationic monomer and the constitutional unit derived from the hydrophobic monomer in the cationic polymer is from 70 to 100% by weight, preferably from 80 to 100% by weight and still more preferably from 95 to 100% by weight. In particular, the weight ratio of the constitutional unit derived from the cationic monomer to the constitutional unit derived from the hydrophobic monomer [(constitutional unit derived from cationic monomer)/(constitutional unit derived from hydrophobic monomer)] is preferably from 0.001 to 0.5, more preferably from 0.002 to 0.3 and still more preferably from 0.003 to 0.1 from the viewpoint of good particle forming property.

The cationic polymer may also contain the other monomer constitutional unit formed by copolymerizing a copolymerizable monomer therewith to such an extent that the effects of the present invention are not adversely affected. Examples of the other monomer constitutional unit include constitutional units derived from 2-hydroxyethyl (meth)acrylate, polyethylene glycol (meth)acrylates having an average molar number of addition of alkanediyl groups of 2 to 30 as well as methoxy-polyethylene glycol (meth)acrylates having an average molar number of addition of oxy-alkanediyl groups of 2 to 20, octoxy-polyethylene glycol (meth)acrylate, vinyl pyrrolidone, vinyl alcohol, ethyleneoxide, polyethyleneoxide (meth)acrylate and acrylamide.

The cationic polymer may be produced by subjecting a monomer mixture containing a cationic group-containing ethylenically unsaturated monomer to emulsion polymerization in the presence of a cationic surfactant by a known method. The content of the cationic surfactant used in the emulsion polymerization is preferably from 3 to 20 parts by weight and more preferably from 5 to 15 parts by weight on the basis of 100 parts by weight of the monomer in order to reduce a particle diameter of the obtained polymer particles and increase a cationic charge amount per unit area.

Examples of the initiator usable in the polymerization for production of the polymer include known inorganic peroxides, organic initiators and redox polymerization initiators. Specific examples of the inorganic peroxides include hydrogen peroxide, potassium persulfate and ammonium persulfate. Specific examples of the organic initiators include organic peroxides such as cumene hydroperoxide, diisopropylbenzene hydroperoxide and p-menthane hydroperoxide; and azo-based initiators such as 2,2'-azobis(2-amidinopropane) dihydrochloride, azobis(diisobutyronitrile), methoxybenzene diazomercaptonaphthalene.

Specific examples of the redox polymerization initiators include combination of a peroxide or an oxidizing agent with a reducing agent such as sodium hydrogen sulfite, sodium thiosulfate, ferrous sulfate and sugars.

Examples of the cationic surfactant used in the polymerization include quaternary ammonium salts, nitrogen-based cationic group-containing compounds, and surfactants capable of exhibiting a cationic property by adjusting a pH thereof. Specific examples of the cationic surfactant include alkyl amine salts, quaternary ammonium salts, alkyl betaines and alkyl amine oxides, wherein the alkyl group preferably has 12 to 22 carbon atoms.

Examples of the alkyl amine salts include lauryl amine acetate and stearyl amine acetate. Examples of the quaternary ammonium salts include alkyltrimethyl ammonium chlorides such as lauryltrimethyl ammonium chloride, stearyltrimethyl ammonium chloride and cetyltrimethyl ammonium chloride; dialkyldimethyl ammonium chlorides such as distearyldimethyl ammonium chloride; and alkylbenzyldimethyl ammonium chlorides.

Examples of the alkyl betaines include lauryl betaine and stearyl betaine.

Examples of the alkyl amine oxides include 2-alkyl-N-carboxymethyl-N-hydroxyethyl imidazolium betaines and lauryldimethyl amine oxide. Among these cationic surfactants, especially preferred are quaternary ammonium salts.

(2-2-2) Nonionic Polymer

The nonionic polymer as used herein means a polymer incapable of exhibiting an electric charge in an aqueous solution thereof. The nonionic polymer is a polymer derived from an electrically unchargeable monomer, i.e., a nonionic monomer, and may be obtained by polymerizing the nonionic monomer. As the nonionic monomer, there may be used the hydrophobic monomers as described above with respect to the cationic polymer. Examples of the suitable nonionic monomer include one or more compounds selected from the group consisting of alkyl (meth)acrylates containing an alkyl group having 1 to 30 carbon atoms, preferably 3 to 22 carbon atoms and more preferably 3 to 18 carbon atoms, vinyl acetate and styrene.

Examples of the nonionic polymer include polymers constituted from the hydrophobic monomer, and copolymers of the hydrophobic monomer with the below-mentioned nonionic monomer.

Examples of the other nonionic monomer capable of being suitably copolymerized with the hydrophobic monomer include one or more compounds selected from the group consisting of vinyl pyrrolidone, vinyl alcohol, ethyleneoxide, polyethyleneoxide (meth)acrylate and acrylamide.

The nonionic polymer is preferably in the form of a polymer obtained by using styrene or an alkyl acrylate as the hydrophobic monomer. Among the other nonionic monomers, preferred is vinyl pyrrolidone.

Specific examples of the nonionic polymer include polystyrene, ethyl acrylate-ethyl methacrylate copolymers, ethyl acrylate-methyl methacrylate copolymers, octyl acrylate-styrene copolymers, butyl acrylate-vinyl acetate copolymers, methyl methacrylate-butyl acrylate-octyl acrylate copolymers, vinyl acetate-styrene copolymers, vinyl pyrrolidone-styrene copolymers, butyl acrylate and polystyrene acrylic acid resins.

The nonionic polymer is preferably in the form of particles having a spherical shape. It is considered that such a copolymer forms a hydrated phase having a hydrophilic interface portion in a water dispersion system and thereby can be kept in a stable state therein. Further, the nonionic polymer can maintain its spherical shape in a medium having a continuous water phase.

As the polymerization method for production of the nonionic polymer, there may be used known emulsion polymerization and emulsifier-free polymerization.

(2-2-3) Amphoteric Polymer

Examples of the amphoteric polymer include copolymers of a monomer containing an anionic group such as a carboxyl group and a sulfonic group with the above-mentioned cationic monomer, polymers or copolymers of a carboxybetaine-type monomer, cationic polymers into which an anionic group such as a carboxyl group or a sulfonic group is introduced, and anionic polymers into which a basic nitrogen-containing group is introduced. The amphoteric polymer preferably contains a constitutional unit derived from the above hydrophobic monomer. It is more preferred that almost all the constitutional units of the amphoteric polymer be composed of the constitutional units derived from the hydrophobic monomer.

The ratio (molar ratio) of the anionic group to the cationic group [(anionic group)/(cationic group)] in the amphoteric polymer is preferably 0.8 or less, more preferably from 0.01 to 0.5 and still more preferably from 0.03 to 0.3. When the molar ratio of the anionic group is increased, it is difficult to obtain composite silica particles incorporating the polymer therein and having mesopores in an outer shell portion thereof, or hollow mesoporous silica particles having mesopores in an outer shell portion thereof.

Among the cationic, nonionic and amphoteric polymers, preferred are the cationic polymer and the nonionic polymer. From the viewpoint of facilitated production of the composite silica particles, more preferred is the cationic polymer.

The polymer used for production of the composite silica particles is substantially water-insoluble. Such a water-insoluble polymer may be produced by a method of increasing a proportion of the hydrophobic monomer to be polymerized, or a method of crosslinking the hydrophobic monomer therewith.

Examples of the suitable polymer used in the present invention include a copolymer of a hydrophobic monomer selected from an alkyl (meth)acrylate and styrene with a cationic group-containing (meth)acrylate, and a nonionic polymer obtained from at least one hydrophobic monomer selected from an alkyl (meth)acrylate and styrene.

These polymers may be used alone or in the form of a mixture of any two or more thereof.

The average particle diameter of the polymer particles may be suitably determined according to aimed applications of the composite silica particles and the hollow silica particles, and is preferably from 10 to 400 nm, more preferably from 20 to 200 nm and still more preferably from 30 to 150 nm.

The average particle diameter may be measured using a laser particle analyzing system "ELS-8000" (cumulant analysis) available from Otsuka Electronics Co., Ltd. The measurement is conducted at a temperature of 25° C., an angle between incident light and detector of 90° and a cumulative frequency of 200 times, and a refractive index of water (1.333) is input to the analyzing system as a refractive index of the dispersing medium. The concentration of the polymer particles in a dispersion is usually about $5 \times 10^{-3}$% by weight.

The shape and configuration of the polymer particles are not particularly limited. The size of the polymer particles may suitably vary, or the polymer particles may be formed into a spherical shape, an oval shape, etc., depending upon the aimed applications of the composite silica particles and the hollow silica particles. In addition, the polymer particle may also be, for example, in the form of a microcapsule containing a metal catalyst, etc. The shape and configuration of the polymer particles may be adequately controlled according to kinds of polymers used, agitation power upon mixing, temperature of a solution, etc.

(3) Process for Production of Hollow Silica Particles

The hollow silica particles of the present invention may be produced, for example, by the following processes A and B. Meanwhile, the composite silica particles are obtained as an intermediate product in the process A.

(3-1) Process A: Process for Producing Hollow Silica Particles Having an Outer Shell Portion of a Mesoporous Structure which Includes the Following Steps (I), (II) and (III):

(I) preparing an aqueous solution containing (a) 0.1 to 100 mmol/L of at least one compound selected from the group consisting of quaternary ammonium salts represented by the following general formulae (1) and (2):

$$[R^1(CH_3)_3N]^+X^- \quad (1), \text{and}$$

$$[R^1R^2(CH_3)_2N]^+X^- \quad (2)$$

wherein $R^1$ and $R^2$ are each independently a linear or branched alkyl group having 4 to 22 carbon atoms; and X is a monovalent anion;

(b) 0.1 to 100 mmol/L of a silica source capable of forming a silanol compound by hydrolysis thereof (c1) 0.1 to 100 mmol/L of a hydrophobic organic compound or (c2) 0.01 to 10% by mass of a polymeric organic compound; and water;

(II) stirring the aqueous solution prepared in the step (I) at a temperature of 10 to 100° C. to precipitate composite silica particles including silica particles which include an outer shell portion having a mesoporous structure, and the hydrophobic organic compound (c1) or the polymeric organic compound (c2) incorporated inside of the silica particles; and (III) baking the composite silica particles obtained in the step (II).

In the following, the respective components used in the steps (I), (II) and (III) are described.

<Quaternary Ammonium Salt (a)>

The quaternary ammonium salt as the component (a) is used for forming the mesopores and dispersing the hydrophobic organic compound.

In the above general formulae (1) and (2), $R^1$ and $R^2$ are each independently a linear or branched alkyl group having 4 to 22 carbon atoms, preferably 6 to 18 carbon atoms and more preferably 8 to 16 carbon atoms. Examples of the alkyl group having 4 to 22 carbon atoms include various butyl groups, various pentyl groups, various hexyl groups, various heptyl groups, various octyl groups, various nonyl groups, various decyl groups, various dodecyl groups, various tetradecyl groups, various hexadecyl groups, various octadecyl groups and various eicosyl groups.

X in the general formulae (1) and (2) is preferably at least one monovalent anion selected from the group consisting of a halogen ion, a hydroxide ion, a nitrate ion and a sulfate ion from the viewpoint of increasing crystalline construction. X is more preferably a halogen ion, still more preferably a chlorine ion or a bromine ion and most preferably a bromine ion.

Examples of the alkyltrimethyl ammonium salt represented by the general formula (1) include butyltrimethyl ammonium chloride, hexyltrimethyl ammonium chloride, octyltrimethyl ammonium chloride, decyltrimethyl ammonium chloride, dodecyltrimethyl ammonium chloride, tetradecyltrimethyl ammonium chloride, hexadecyltrimethyl ammonium chloride, stearyltrimethyl ammonium chloride, butyltrimethyl ammonium bromide, hexyltrimethyl ammonium bromide, octyltrimethyl ammonium bromide, decyltrimethyl ammonium bromide, dodecyltrimethyl ammonium bromide, tetradecyltrimethyl ammonium bromide, hexadecyltrimethyl ammonium bromide and stearyltrimethyl ammonium bromide.

Examples of the dialkyldimethyl ammonium salt represented by the general formula (2) include dibutyldimethyl ammonium chloride, dihexyldimethyl ammonium chloride, dioctyldimethyl ammonium chloride, dihexyldimethyl ammonium bromide, dioctyldimethyl ammonium bromide, didodecyldimethyl ammonium bromide and ditetradecyldimethyl ammonium bromide.

Among these quaternary ammonium salts (a), from the viewpoint of forming regular mesopores, especially preferred are the alkyltrimethyl ammonium salts represented by the general formula (1), more preferred are alkyltrimethyl ammonium bromides and alkyltrimethyl ammonium chlorides, and still more preferred are dodecyltrimethyl ammonium bromide and dodecyltrimethyl ammonium chloride.

<Silica Source (b)>

The silica source as the component (b) include those capable of producing a silanol compound by hydrolysis of alkoxysilanes or the like. More specifically, the silica source includes compounds represented by the following general formulae (3) to (7):

$$SiY_4 \quad (3);$$

$$R^3SiY_3 \quad (4);$$

$$R^3_2SiY_2 \quad (5);$$

$$R^3_3SiY \quad (6); \text{and}$$

$$Y_3Si-R^4-SiY_3 \quad (7),$$

wherein $R^3$ groups are each independently an organic group having a carbon atom directly bonded to a silicon atom; $R^4$ is a hydrocarbon group having 1 to 4 carbon atoms or a phenylene group; and Y is a monovalent hydrolysable group capable of being hydrolyzed into a hydroxyl group.

In the general formulae (3) to (7), the $R^3$ groups are preferably each independently a hydrocarbon group having 1 to 22 carbon atoms in which a part of hydrogen atoms may be substituted with a fluorine atom. Specific examples of $R^3$ include an alkyl group having 1 to 22 carbon atoms, preferably 4 to 18 carbon atoms, more preferably 6 to 18 carbon atoms and still more preferably 8 to 16 carbon atoms, a phenyl group and a benzyl group. $R^4$ is preferably an alkanediyl group having 1 to 4 carbon atoms (such as a methylene group, an ethylene group, a trimethylene group, a propane-1,2-diyl group and a tetramethylene group) or a phenylene group. Y is preferably an alkoxy group having 1 to 22 carbon atoms, preferably 1 to 8 carbon atoms and more preferably 1 to 4 carbon atoms, or a halogen group except for fluorine.

Examples of the suitable silica source (b) include the following compounds.

Silane compounds of the general formula (3) in which Y is an alkoxy group having 1 to 3 carbon atoms, or a halogen group except for fluorine.

Trialkoxysilanes or dialkoxysilanes of the general formula (4) or (5) in which $R^3$ is a phenyl group, a benzyl group, or a hydrocarbon group having 1 to 20 carbon atoms, preferably 1 to 10 carbon atoms and more preferably 1 to 5 carbon atoms in which a part of hydrogen atoms may be substituted with a fluorine atom.

Compounds of the general formula (7) in which Y is a methoxy group, and $R^4$ is a methylene group, an ethylene group or a phenylene group.

Among these compounds, especially preferred are tetramethoxysilane, tetraethoxysilane, phenyl triethoxysilane and 1,1,1-trifluoropropyl triethoxysilane.

<Hydrophobic Organic Compound (c1) or Polymeric Organic Compound (c2)>

The details of the hydrophobic organic compound (c1) or polymeric organic compound (c2) as the component (c) are the same as those described previously with respect to the composite silica particles.

Meanwhile, the hydrophobic organic compound (c1) may be mixed with the other functional substance according to the requirements to thereby render the resulting composite silica particles utilizable in broader applications.

The contents of the quaternary ammonium salt (a), the silica source (b) and the hydrophobic organic compound (c1) or the polymeric organic compound (c2) in the aqueous solution prepared in the step (I) are as follows.

The content of the component (a) in the aqueous solution is from 0.1 to 100 mmol/L, preferably from 1 to 100 mmol/L and more preferably from 5 to 80 mmol/L. The content of the component (b) in the aqueous solution is from 0.1 to 100 mmol/L, preferably from 1 to 100 mmol/L and more preferably from 5 to 80 mmol/L.

The content of the component (c1) in the aqueous solution is from 0.1 to 100 mmol/L, preferably from 1 to 100 mmol/L and more preferably from 5 to 80 mmol/L. The concentration by mass of the component (c1) in the aqueous solution is preferably from 0.1 to 50 g/L, more preferably from 0.3 to 40 g/L and still more preferably from 0.5 to 30 g/L. The concentration by mass of the component (c2) in the aqueous solution is preferably from 0.1 to 50 g/L, more preferably from 0.3 to 40 g/L and still more preferably from 0.5 to 30 g/L.

The order of addition of the components (a) to (c) is not particularly limited. For example, there may be adopted a method in which the components (a), (b) and (c) are sequentially charged into water in this order while stirring the resulting aqueous solution (exemplary method 1), a method in which the components (a), (b) and (c) are charged into water at the same time while stirring the resulting aqueous solution (exemplary method 2), or a method in which the components (a), (b) and (c) are charged into water, followed by stirring the resulting aqueous solution (exemplary method 3). Among these exemplary methods, preferred is the exemplary method 1.

The aqueous solution containing the components (a) to (c) may also contain the other components including an organic compound such as methanol, an inorganic compound, etc., unless the addition thereof adversely affects formation of the composite silica particles of the present invention. When it is desirable to incorporate the other metal elements in addition to silica and the organic groups into the composite silica particles as described above, a raw metal material such as an alkoxylate and a halide containing these metals may be added during or after production of the composite silica particles.

Meanwhile, when the hydrophobic organic compound (c1) or the polymeric organic compound (c2) is formed into droplets in the step (I) or an early stage of the step (II), formation of the droplets may be performed by controlling the temperature of the reaction system.

In the step (II), the composite silica particles as an intermediate product of the hollow silica particles are formed. The aqueous solution prepared in the step (I) is stirred at a temperature of from 10 to 100° C. and preferably from 10 to 80° C. for a desired time, and then allowed to stand, so that mesopores are formed from the quaternary ammonium salt (a) and the silica source (b) on the surface of the respective oil droplets of the hydrophobic organic compound, thereby precipitating composite silica particles in which the hydrophobic organic compound (c1) or the polymeric organic compound (c2) is incorporated. The stirring time of the aqueous solution may vary depending upon the temperature. The composite silica particles may be usually produced by stirring the aqueous solution at a temperature of from 10 to 80° C. for 0.1 to 24 h.

The composite silica particles are obtained in the form of a water suspension. The water suspension of the composite silica particles may be used as such in some applications. The composite silica particles are preferably separated from the suspension upon use. The composite silica particles may be separated from the water suspension by filtration, centrifugal separation, etc.

The composite silica particles obtained in the step (II) usually contain the cationic surfactant, etc. The cationic surfactant, etc., may be removed by baking the composite silica particles in the step (III). However, when it is intended to use the composite silica particles as such, the cationic surfactant can be removed by contacting the composite silica particles obtained in the step (II) with an acid solution one or plural times, for example, by mixing the composite silica particles in an aqueous acid solution. The resulting composite silica particles may be dried at such a temperature that the hydrophobic organic compound (c1), if incorporated therein, is not excessively vaporized therefrom. Examples of the acid solution used above include inorganic acids such as hydrochloric acid, nitric acid and sulfuric acid; organic acids such as acetic acid, citric acid; and solutions prepared by adding a cation exchange resin, etc., to water or methanol. Among these acid solutions, especially preferred is hydrochloric acid. The pH of the acid solution is usually adjusted to 1.5 to 5.0.

The thus obtained composite silica particles have a surface of a mesoporous structure, a large BET specific surface area, and incorporate the hydrophobic organic compound (c1) or the polymeric organic compound (c2) therein. In the step (III) as the baking step, the composite silica particles obtained in the step (II) are separated from the dispersing medium, and then, if desired, after being contacted with an aqueous acid solution and subjected to washing with water, drying and high-temperature treatment to remove the hydrophobic organic compound inside of the particles, the composite silica particles are baked at a temperature of preferably from 350 to 800° C. and more preferably from 450 to 700° C. for 1 to 10 h by using an electric furnace, etc.

(3-2) Process B: Process for Producing Hollow Silica Particles Having an Outer Shell Portion of a Mesoporous Structure which Includes the Following Steps (i), (ii) and (iii):

(i) preparing an aqueous solution containing (a) 0.1 to 100 mmol/L of at least one compound selected from the group consisting of quaternary ammonium salts represented by the following general formulae (1) and (2):

$$[R^1(CH_3)_3N]^+X^- \quad (1), \text{ and}$$

$$[R^1R^2(CH_3)_2N]^+X^- \quad (2)$$

wherein $R^1$ and $R^2$ are each independently a linear or branched alkyl group having 4 to 22 carbon atoms; and X is a monovalent anion;

and (b') 0.1 to 100 mmol/L of two or more silica sources capable of forming a silanol compound by hydrolysis thereof which are different in hydrolysis rate from each other, at least one of the silica sources including an organic group;

(ii) stirring the aqueous solution prepared in the step (i) at a temperature of 10 to 100° C. to precipitate a composite material including the quaternary ammonium salt and silica; and (iii) subjecting the composite material including the quaternary ammonium salt and silica obtained in the step (ii) to baking or extraction treatment to remove the quaternary ammonium salt from the composite material.

When using two or more silica sources capable of forming silanol by hydrolysis thereof which are different in hydrolysis rate from each other, the aimed hollow silica particles having an outer shell portion of a mesoporous structure are obtained without using the organic compound used as the component (c) in the process A. The other steps (ii) and (iii) are basically the same as those steps of the process A. However, in the process B, since the composite silica particles in which the organic compound (c) is incorporated are not produced, the mesopores may be formed by the method other than baking, for example, by the method of treating the composite material with an acid solution to extract the quaternary ammonium salt from an inside of the mesopores.

According to the process B, it is possible to efficiently produce hollow silica particles having an outer shell portion of a mesoporous structure in which the outer shell portion is constituted from an organic group-containing silicon compound, and an average pore size of the mesopores is in the range of from 1 to 10 nm.

The silicon compound as used herein means a silicon oxide or a silicon hydroxide formed by polymerization of silanol $(H_nSi(OH)_{4-n})$. Also, the organic group-containing silicon compound as used herein means such a compound formed by polymerization of a compound containing an organic group directly bonded to silicon of the silanol. The silicon compound used in the present invention also includes those containing the below-mentioned other elements in addition to the organic group.

The organic group directly bonded to silicon of the silicon compound is preferably a hydrocarbon group having 1 to 22 carbon atoms in which a part of hydrogen atoms contained therein may be substituted with a fluorine atom. Examples of the hydrocarbon group as a group bonded to one silicon atom include an alkyl group preferably having 1 to 22 carbon atoms, more preferably 1 to 8 carbon atoms and still more preferably 1 to 4 carbon atoms, a phenyl group and a benzyl group. The hydrocarbon group as a group bonded to two silicon atoms is preferably at least one group selected from the group consisting of an alkanediyl group preferably having 1 to 22 carbon atoms, more preferably 1 to 12 carbon atoms and still more preferably 1 to 6 carbon atoms, and a phenylene group.

Examples of the alkyl group having 1 to 22 carbon atoms include methyl, ethyl, various propyl groups, various butyl groups, various pentyl groups, various hexyl groups, various heptyl groups, various octyl groups, various nonyl groups, various decyl groups, various dodecyl groups, various tetradecyl groups, various hexadecyl groups, various octadecyl groups and various eicosyl groups.

Examples of the alkanediyl group having 1 to 22 carbon atoms, in particular, 1 to 6 carbon atoms, include a methylene group, an ethylene group, a trimethylene group, a propane-1,2-diyl group, a tetramethylene group and a pentamethylene group.

The silica sources that are different in hydrolysis rate from each other are described in detail below.

<Two Kinds of Silica Sources that are Different in Hydrolysis Rate from Each Other (b')>

The two or more kinds of silica sources that are different in hydrolysis rate from each other are selected from the compounds represented by the above general formulae (3) to (7) except for combination of the compounds of the general formula (3) or (6) solely.

$$SiY_4 \quad (3);$$

$$R^3SiY_3 \quad (4);$$

$$R^3_2SiY_2 \quad (5);$$

$$R^3_3SiY \quad (6); \text{ and}$$

$$Y_3Si\text{—}R^4\text{—}SiY_3 \quad (7),$$

wherein $R^3$ groups are each independently an organic group having a carbon atom directly bonded to a silicon atom; $R^4$ is a hydrocarbon group having 1 to 4 carbon atoms or a phenylene group; and Y is a monovalent hydrolysable group capable of being hydrolyzed into a hydroxyl group.

$R^3$, $R^4$ and Y in the general formulae (3) to (7) are the same as those described with respect to the above composite silica particles.

The hydrolysis rate of the silica sources may vary depending upon kinds of $R^3$, $R^4$ and the hydrolysable group Y as well as the number of the $R^3$ groups. When using an electron donative group as $R^3$ or $R^4$, the hydrolysis rate of the silica source is decreased, whereas when using an electron attractive group as $R^3$ or $R^4$, the hydrolysis rate thereof is increased. For example, when $R^3$ is an alkyl group having 1 to 22 carbon atoms, the group donates an electron to the silicon atom, so that a hydrolysis rate of the hydrolysable group Y is reduced. Also, when $R^3$ is a phenyl group or a hydrocarbon group in which a part of hydrogen atoms contained therein are substituted with a fluorine atom, the silica source exhibits a high electron attracting property, so that a hydrolysis rate thereof is increased. $R^4$ has a similar tendency to $R^3$.

An ethoxy group as the hydrolysable group Y exhibits a low hydrolysis rate than that of a methoxy group. As the number of carbon atoms in an alkoxy group increases, the hydrolysis rate of the alkoxy group becomes lower.

Meanwhile, when using the silica sources of the general formula (3) solely, the hydrolysable group Y is easily hydrolyzed, thereby failing to form an outer shell portion containing an organic group. In addition, when using the silica sources of the general formula (6) solely, it is difficult to form a silica structure by polymerization thereof. Therefore, these combinations of the silica sources of the general formula (3) or (6) solely are excluded from the two or more kinds of silica sources that are different in hydrolysis rate from each other as defined in the present invention.

The two or more kinds of silica sources that are different in hydrolysis rate from each other as used in the present invention are generally classified into a "silica source with a high hydrolysis rate" and a "silica source with a low hydrolysis rate" on the basis of the difference in hydrolysis rate therebetween.

The "silica source with a high hydrolysis rate" as used herein means a silica source (b1) for which the time required until producing hollow silica particles therefrom as measured by the below-mentioned method is 150 s or shorter, preferably 120 s or shorter and more preferably 100 s or shorter, whereas the "silica source with a low hydrolysis rate" as used herein means a silica source (b2) for which the time required until producing hollow silica particles therefrom as measured by the below-mentioned method is 200 s or longer, preferably 250 s or longer and more preferably 300 s or longer.

That is, the two or more kinds of silica sources that are different in hydrolysis rate from each other as used in the present invention are preferably two or more silica sources having different hydrolysis rates from each other such that the times required until producing hollow silica particles therefrom as measured by the below-mentioned method are different by 50 s or more from each other.

The hydrolysis rate of the respective silica sources may be determined as follows. Namely, upon producing silica particles by using the silica source singly, the time elapsed from addition of the silica source to formation of the silica particles, i.e., until the reaction solution is whitely turbid, is measured. More specifically, 60 g of water, 20 g of methanol, 0.46 g of a 1M sodium hydroxide aqueous solution and 0.35 g of dodecyltrimethyl ammonium bromide (available from Tokyo Chemical Industry Co., Ltd.) are charged into a 100 mL beaker, and stirred at 20° C. using a magnetic stirrer (rotor: 22 mm octagon type) at 500 rpm until dodecyltrimethyl ammonium bromide is completely dissolved. Under the stirring condition, 0.5 g of the silica source is added to the beaker at one time to measure the time required until the solution is whitely turbid.

Examples of the silica source (b1) with a high hydrolysis rate include the following compounds.

Silane compounds of the general formula (3) in which Y is an alkoxy group having 1 to 3 carbon atoms, or a halogen group except for fluorine.

Trialkoxysilanes or dialkoxysilanes of the general formula (4) or (5) in which $R^3$ is a phenyl group, a benzyl group, or a hydrocarbon group having 1 to 20 carbon atoms, preferably 1 to 10 carbon atoms and more preferably 1 to 5 carbon atoms in which a part of hydrogen atoms are substituted with a fluorine atom.

Compounds of the general formula (7) in which Y is a methoxy group, and $R^4$ is a methylene group, an ethylene group or a phenylene group.

Examples of the silica source (b2) with a low hydrolysis rate include the following compounds.

Compounds of any of the general formulae (4) to (6) in which $R^3$ is an alkyl group having 1 to 22 carbon atoms and preferably 1 to 10 carbon atoms.

Compounds of the general formula (7) in which Y is an ethoxy group, and $R^4$ is a methylene group or an ethylene group.

The silica source (b1) with a high hydrolysis rate is preferably at least one compound selected from the group consisting of tetraalkoxysilanes containing an alkoxy group having 1 to 3 carbon atoms (such as tetramethoxysilane and tetraethoxysilane), phenyl triethoxysilane and 1,1,1-trifluoropropyl triethoxysilane.

The silica source (b2) with a low hydrolysis rate is preferably at least one compound selected from the group consisting of methyl trimethoxysilane, ethyl trimethoxysilane, propyl trimethoxysilane, dimethyl dimethoxysilane, trimethyl methoxysilane, bistriethoxysilyl methane and bistriethoxysilyl ethane.

Among these silica sources, from the viewpoint of obtaining hollow silica particles having a uniform particle diameter, combination of tetramethoxysilane as the silica source (b1) with a high hydrolysis rate with bistriethoxysilyl methane, bistriethoxysilyl ethane or dimethyl dimethoxysilane as the silica source (b2) with a low hydrolysis rate is especially preferred.

The mixing ratio of the silica source (b1) with a high hydrolysis rate to the silica source (b2) with a low hydrolysis rate [(b1)/(b2)] is preferably from 90/10 to 10/90 and more preferably from 70/30 to 30/70 in terms of silica element ratio therebetween.

When using the two or more kinds of silica sources that are different in hydrolysis rate from each other, the effects of the present invention are effectively exhibited. The mechanism is considered as follows.

When using combination of the silica sources that are different in hydrolysis rate from each other, the silica source with a low hydrolysis rate exhibits a hydrophobicity and is, therefore, formed into oil droplets in an aqueous solution. On the other hand, the silica source with a high hydrolysis rate is rapidly hydrolyzed into a silanol compound and dispersed in the aqueous solution. As a result, it is considered that the resulting silanol compound is formed together with the component (a) into a film along an interface between each oil droplet of the silica source with a low hydrolysis rate and water.

Since the silica source with a low hydrolysis rate is formed into oil droplets, water is prevented from penetrating inside thereof, so that hydrolysis reaction of the silica source is inhibited, resulting in difficult production of a silanol compound therefrom. On the other hand, the polymerization reaction of the silanol compound present on the surface of the respective oil droplets of the silica source with a low hydrolysis rate proceeds while incorporating the component (a) thereinto. Thereafter, the silica source with a low hydrolysis rate is gradually hydrolyzed and subjected to dehydration condensation to form mesopores. Finally, an inside of the respective particles is filled with alcohol produced by the hydrolysis or water discharged from the dehydration condensation reaction. The alcohol and water thus filled inside of the respective particles are vaporized in the subsequent drying and baking steps to form the silica particles having a hollow structure.

The concentration of the component (a) in the aqueous solution prepared in the step (i) is preferably from 0.1 to 100 mmol/L, more preferably from 1 to 100 mmol/L and still more preferably from 5 to 80 mmol/L. The concentration of the component (b') in terms of a total amount of the components (b1) and (b2) in the aqueous solution prepared in the step (i) is preferably from 0.1 to 500 mmol/L, more preferably from 1 to 300 mmol/L and still more preferably from 10 to 300 mmol/L.

The order of addition of the components (a) and (b') is not particularly limited, and these components may be added in the same manners (exemplary methods 1 to 3) as described above in the process A. The order of mixing of the components (b1) and (b2) is as follows. That is, it is preferred that the component (b2) and then the component (b1) are sequentially added, or the components (b1) and (b2) are added at the same time.

The other components such as organic compounds, e.g., solvents, and inorganic compounds may be added to the aqueous solution containing the components (a) and (b'), unless the components inhibit formation of the hollow structure and mesoporous structure of the hollow silica particles of the present invention. As described above, when it is intended to incorporate elements other than silica and the organic groups such as, for example, Al, Ti, V, Cr, Co, Ni, Cu, Zn, Zr, B, Mn and Fe, a metal-containing raw material such as an alkoxylate or a halide containing these metals may be added during or after production of the hollow silica particles.

In the step (ii), the aqueous solution prepared in the step (i) is stirred at a temperature of from 10 to 100° C. and preferably from 10 to 80° C. for a desired time and then allowed to stand to precipitate a composite material of the quaternary ammonium salt and silica. Although the heating and stirring time varies depending upon the temperature, the composite material of the quaternary ammonium salt and silica is usually formed by stirring the aqueous solution at a temperature of from 10 to 100° C. for from 0.1 to 24 h.

In the step (iii), the composite material obtained in the step (ii) is first taken out of the reaction solution by filtration or centrifugal separation, washed with water and then dried. Next, the composite material of the quaternary ammonium salt and silica is subjected to baking or extraction treatment to remove the quaternary ammonium salt from the composite material. When the baking temperature is too low, the component (a) serving as a mesopore-forming agent tends to remain in the resulting product. When the baking temperature is too high, the organic groups in the silicon compound tend to be disappeared. For this reason, the baking is desirably performed at a temperature of preferably from 350 to 650° C., more preferably from 450 to 550° C. and still more preferably from 480 to 520° C. for 1 to 10 h by using an electric furnace, etc. In the extraction treatment, if conducted, the composite material of the quaternary ammonium salt and silica is stirred in an aqueous solution having a pH of 1 to 4 and a temperature ranging from room temperature to 80° C. for a long period of time to thereby extract the quaternary ammonium salt therefrom. Meanwhile, the silica obtained after the extraction treatment may be subjected to baking.

In the following, a preferred example of the process B and the hollow silica particles produced thereby are described.

First, in the step (i), a quaternary ammonium compound of the general formula (1) or (2) wherein $R^1$ and $R^2$ are respectively an alkyl group having 4 to 22 carbon atoms; and X is a bromine ion or a chlorine ion, as the component (a), is dissolved in a basic aqueous solution, and then uniformly mixed with tetraalkoxysilane containing an alkoxy group having 1 to 3, preferably tetramethoxysilane or tetraethoxysilane, as the silica source (b1) with a high hydrolysis rate, and at least one compound selected from bistrimethoxysilyl ethane, bistrimethoxysilyl methane and dimethyldimethoxysilane, preferably bistrimethoxysilyl ethane, as the silica source (b2) with a low hydrolysis rate.

Successively, in the step (ii), the resulting mixture is stirred at a temperature of from 10 to 100° C. and preferably from 10 to 80° C. for 0.1 to 24 h using a magnetic stirrer, and then aged for 1 to 24 h to obtain a whitely turbid solution in which hollow silica particles are precipitated.

Thereafter, in the step (iii), the resulting particles are separated from the solution by filtration through a membrane filter, washed with water, and then dried at a temperature of from 60 to 100° C. for 5 to 20 h. The resulting dried particles are then baked at a temperature of from 450 to 550° C. and preferably from 480 to 520° C. for 1 to 20 h, thereby obtaining hollow silica particles.

The thus obtained hollow silica particles have an outer shell portion of a mesoporous structure and exhibit the following properties.

Average particle diameter: preferably from 0.05 to 10 μm, more preferably from 0.1 to 5 μm and still more preferably from 0.2 to 2 μm Proportion of particles having a particle diameter falling within the range of ±30% of the average particle diameter: preferably 80% by mass or more, more preferably 85% by mass or more and still more preferably 90% by mass or more on the basis of the whole particles.

BET specific surface area: preferably 700 $m^2/g$ or more, more preferably from 800 to 1400 $m^2/g$ and still more preferably from 800 to 1300 $m^2/g$.

Thickness of outer shell portion: preferably from 5 to 3000 nm, more preferably from 10 to 1000 nm and still more preferably from 50 to 800 nm.

Ratio of thickness of outer shell portion to average particle diameter [(thickness of outer shell portion)/(average particle diameter)]: preferably from 0.2/100 to 50/100, more preferably from 0.5/100 to 40/100 and still more preferably from 1/100 to 30/100.

Average pore size of pores in outer shell portion: preferably from 1 to 10 nm, more preferably from 1 to 8 nm and still more preferably from 1 to 5 nm.

Content of hollow particles by observation using transmission electron microscope (TEM): preferably 80% by mass or more, more preferably 85% by mass or more and still more preferably 90% by mass or more on the basis of the whole particles.

EXAMPLES

Various properties of the silica particles obtained in the following Examples and Comparative Examples were measured by the following methods.

(1) Measurement of Average Particle diameter and Average Outer Shell Thickness

Using a transmission electron microscope (TEM) "JEM-2100" available from JEOL Ltd., diameters and outer shell thicknesses of whole particles appearing on five visual fields respectively containing 20 to 30 particles on a microphotograph thereof were actually measured at an acceleration voltage of 160 kV to determine an average particle diameter and an average outer shell thickness of the particles. A sample used for the measurement was prepared by attaching a sample material onto a Cu mesh "200-A Mesh" (available from Okenshoji Co., Ltd.) with a high resolution carbon supporting membrane and then removing an excessive amount of the sample material by blowing.

(2) Measurement of BET Specific Surface Area and Average Pore Size

Using a specific surface area/pore size distribution measuring device "ASAP2020" (tradename) available from Shimadzu Corporation, the BET specific surface area was measured by a multipoint method using liquid nitrogen to derive the value in the range where a parameter C is positive. By using the above BJH method, the average pore size was determined as the peak top. The pre-treatment was conducted at 250° C. for 5 h.

(3) Measurement of Powder X-ray Diffraction (XRD) Pattern

Using a powder X-ray diffractometer "RINT2500VPC" (tradename) available from Rigaku Industrial Corp., the powder X-ray diffraction measurement was conducted under the following conditions: X-ray source: Cu-kα; tube voltage: 40 kV; tube current: 40 mA; sampling width: 0.02°; divergence slit: ½°; divergence slit vertical: 1.2 mm; scattering slit: ½°; light-receiving slit: 0.15 mm. The measurement was performed by a continuous scanning method in a scanning range of diffraction angle (2θ) of from 1 to 20° at a scanning speed of 4.0°/min. Meanwhile, a sample to be measured was crushed and then packed in an aluminum plate.

(4) Identification of Organic Groups in Hollow Silica Particles

In order to confirm that the hollow mesoporous silica particles contain organic groups, the particles were subjected to solid $^{13}$C-NMR measurement. In the NMR measurement, a solid sample was measured using an NMR device "UNITY INOVA300" available from Varian Corp., and the measurement result was corrected using hexamethyl benzene (carbon of methyl group: 17.4 ppm) as an external standard sample.

Example I-1

Production of Oil Agent-Incorporating Mesoporous Silica Particles

A 100 mL flask was charged with 60 g of water, 20 g of methanol, 0.46 g of a 1M sodium hydroxide aqueous solution, 0.35 g of dodecyltrimethyl ammonium bromide and 0.3 g of a rape seed oil (as a hydrophobic organic compound), and the contents of the flask were mixed with each other under stirring. Into the thus obtained aqueous solution was slowly added 0.34 g of tetramethoxysilane, and the resulting mixture was stirred for 5 h and then aged for 12 h. The obtained white precipitate was separated by filtration from the mixture, washed with water and then dried. The resulting dried particles were dispersed in 100 mL of water, and the dispersion was treated with 1M hydrochloric acid to control a pH thereof to 2, and then stirred over night. The obtained white precipitate was separated by filtration from the dispersion, washed with water and then dried, thereby obtaining composite silica particles incorporating the rape seed oil therein and having an outer shell portion of a mesoporous structure.

From the powder X-ray diffraction (XRD) pattern of the thus obtained composite silica particles, it was confirmed that one peak was observed at a diffraction angle corresponding to the range of d=2 to 12 nm. The results of XRD measurement of the obtained composite silica particles are shown in FIG. 1, and properties of the composite silica particles are shown in Table I-1.

Example I-2

The same procedure as in Example I-1 was repeated except for using 0.3 g of squalene in place of the rape seed oil, thereby obtaining composite silica particles. The results are shown in Table I-1.

Meanwhile, in the case where the procedure of Example I-1 was conducted in the same manner as above except for using a functional organic compound in place of the rape seed oil, it was possible to similarly obtain composite silica particles incorporating the functional organic compound therein and having an outer shell portion of a mesoporous structure. From the powder X-ray diffraction (XRD) pattern of the composite silica particles thus obtained in Example I-2, it was also confirmed that one peak was observed at a diffraction angle corresponding to the range of d=2 to 12 nm.

TABLE I-1

|  | Example I-1 | Example I-2 |
| --- | --- | --- |
| Average particle diameter (μm) | 0.65 | 0.60 |
| Content of particles having a particle diameter falling within ±30% of average particle diameter (% by mass) | 100 | 100 |
| BET specific surface area (m²/g) | 677 | 638 |
| Average pore size of mesopores (nm) | 1.48 | 1.43 |
| Thickness of outer shell portion (nm) | 150 | 200 |
| Ratio of (thickness of outer shell portion)/(average particle diameter) | 0.23 | 0.33 |
| Content of mesopores having a pore size falling within ±30% of average pore size (%) | 84 | 81 |

Example I-3

Production of Hollow Silica Particles

A 100 mL flask was charged with 60 g of water, 20 g of methanol, 0.46 g of a 1M sodium hydroxide aqueous solution, 0.35 g of dodecyltrimethyl ammonium bromide and 0.3 g of a rape seed oil (as a hydrophobic organic compound), and the contents of the flask were mixed with each other under stirring. Into the thus obtained aqueous solution was slowly added 0.34 g of tetramethoxysilane, and the resulting mixture was stirred for 5 h and then aged for 12 h. The obtained white precipitate was separated by filtration from the mixture, washed with water and then dried. The resulting dried particles were heated to 600° C. at a temperature rise rate of 1° C./min, and then baked at 600° C. for 2 h to remove the rape seed oil therefrom, thereby obtaining hollow silica particles having an outer shell portion of a mesoporous structure.

Figure 2:
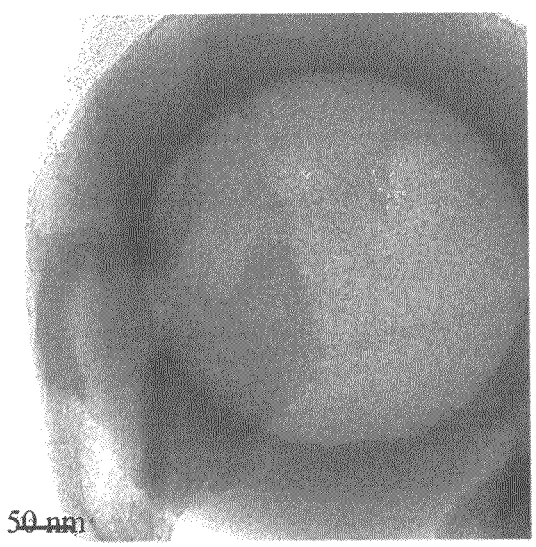
FIG. 2 is a TEM image showing an entire part of the hollow silica particle obtained in Example I-3.
Figure 3:
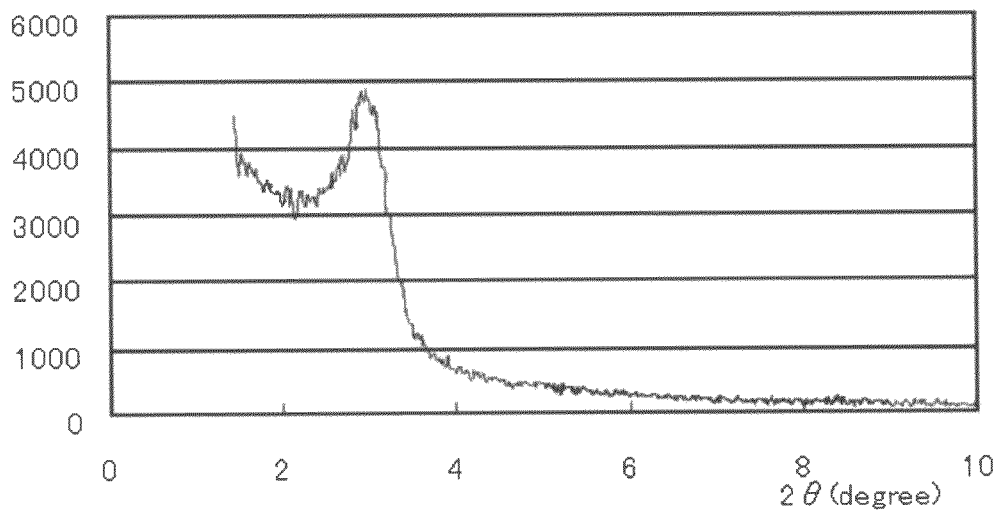
FIG. 3 shows results of XRD measurement of hollow silica particles obtained in Example I-3.

From the powder X-ray diffraction (XRD) pattern of the thus obtained hollow silica particles, it was confirmed that one peak was observed at a diffraction angle corresponding to the range of d=2 to 12 nm. The TEM image of an entire part of the obtained hollow silica particle is shown in FIG. 2, the results of XRD measurement thereof are shown in FIG. 3, and properties of the hollow silica particles are shown in Table I-2.

Example I-4

The rape seed oil-incorporating mesoporous silica particles obtained in Example I-1 were heated to 600° C. at a temperature rise rate of 1° C./min, and then baked at 600° C. for 2 h to remove the rape seed oil therefrom, thereby obtaining hollow silica particles having an outer shell portion of a mesoporous structure. The properties of the thus obtained hollow silica particles are shown in Table I-2.

From the powder X-ray diffraction (XRD) pattern of the thus obtained hollow silica particles, it was confirmed that one or more peaks were observed at a diffraction angle corresponding to the range of d=2 to 12 nm.

Comparative Example I-1

The same procedure as in Example I-3 was repeated except for using no rape seed oil. As a result, it was confirmed that no formation of hollow particles was caused. The results are shown in Table I-2.

Comparative Example I-2

Figure 4:
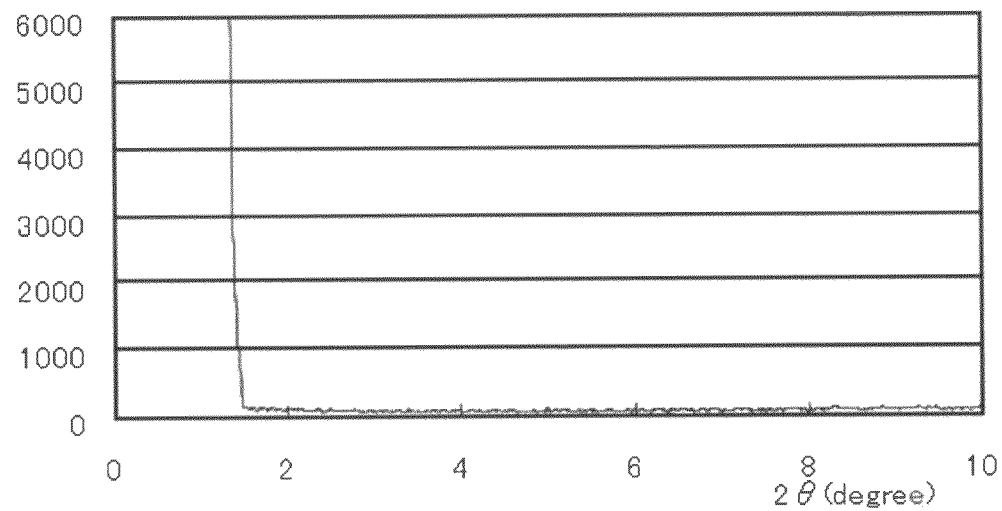
FIG. 4 shows results of XRD measurement of hollow silica particles obtained in Comparative Example I-2.

The results of measurement of hollow silica particles "FUJI BALLOON" available from Fuji Silysia Chemical Ltd., are shown in Table I-2. As a result of measuring a pore size distribution of the hollow silica particles by nitrogen adsorption, it was confirmed that no mesopores in the range of 1 to 10 nm were present, and the specific surface area thereof was very small. The results of XRD measurement of the hollow silica particles are shown in FIG. 4.

TABLE I-2

|  | Example I-3 | Example I-4 | Comparative Example I-1 | Comparative Example I-2 |
|---|---|---|---|---|
| Average particle diameter (μm) | 0.65 | 0.65 | 0.65 | 40 |
| Content of particles having a particle diameter falling within ±30% of average particle diameter (% by mass) | 100 | 100 | 100 | 100 |
| BET specific surface area (m$^2$/g) | 1166 | 962 | 1333 | 0.41 |
| Average pore size of mesopores (nm) | 1.53 | 1.54 | 1.50 | — |
| Thickness of outer shell portion (nm) | 150 | 150 | — | 1000 |
| Ratio of (thickness of outer shell portion)/(average particle diameter) | 0.23 | 0.23 | — | 0.025 |
| Content of mesopores having a pore size falling within ±30% of average pore size (%) | 86 | 83 | 82 | — |

Production Example II-1

Production of Cationic Polymer Particles

A 2 L separable flask was charged with 600 parts of ion-exchanged water, 99.5 parts of methyl methacrylate and 0.5 part of methacryloyloxyethyltrimethyl ammonium chloride, and then inside temperature of the flask was raised to 70° C. Next, a solution prepared by dissolving 0.5 part of 2,2'-azobis(2-amidinopropane) dihydrochloride "V-50" available from Wako Pure Chemical Industries, Ltd., as a water-soluble initiator, in 5 parts of ion-exchanged water, was added to the flask, and the contents of the flask were heated under stirring for 3 h. Thereafter, the mixture was further heated under stirring at 75° C. for 3 h. After cooling, the resulting liquid mixture was filtered through a 200 mesh filter (opening: about 75 μm) to remove aggregates therefrom. The thus obtained filtrate was heated and concentrated using an evaporator, and then cooled. Thereafter, the resulting concentrated solution was filtered through a 1.2 μm membrane filter "Minisart" (tradename) available from Sartorius Inc., and conditioned with ion-exchanged water, thereby obtaining a suspension of cationic polymer particles [solid (effective ingredient) content: 40%; average particle diameter: 312 nm].

Production Example II-2

Production of Nonionic Polymer Particles

A 2 L separable flask was charged with 600 parts of ion-exchanged water and 71.4 parts of stearyltrimethyl ammonium chloride "QUARTAMIN 86W" (effective ingredient content: 28%) available from Kao Corp., and the contents of the flask were placed in a warm bath set at 73° C. and heated while stirring to raise an inside temperature of the flask to 67° C. Next, 1.0 part of 2,2'-azobis(2-amidinopropane) dihydrochloride "V-50" available from Wako Pure Chemical Industries, Ltd., as a water-soluble initiator, and 200 parts of styrene, were added to the flask, and the contents of the flask were heated under stirring for 3 h. After cooling, the resulting liquid mixture was filtered through a 200 mesh filter (opening: about 75 μm) to remove aggregates therefrom. The thus obtained filtrate was heated and concentrated using an evaporator, and then cooled. Thereafter, the resulting concentrated solution was filtered through a 1.2 μm membrane filter "Minisart" (tradename) available from Sartorius Inc., and conditioned with ion-exchanged water, thereby obtaining a suspension of nonionic polymer particles [solid (effective ingredient) content: 20%; average particle diameter: 52 nm].

Production Example II-3

Production of Anionic Polymer Particles

A 2 L separable flask was charged with 600 parts of ion-exchanged water, 99.5 parts of methyl methacrylate and 1 part of sodium styrenesulfonate, and an inside temperature of the flask was raised to 70° C. Next, a solution prepared by dissolving 0.5 part of 2,2'-azobis(2-amidinopropane) dihydrochloride "V-50" available from Wako Pure Chemical Industries, Ltd., as a water-soluble initiator, in 5 parts of ion-exchanged water, was added to the flask, and the contents of the flask were heated under stirring for 3 h. Thereafter, the mixture was further heated under stirring at 75° C. for 3 h. After cooling, the resulting liquid mixture was filtered through a 200 mesh filter (opening: about 75 μm) to remove aggregates therefrom. The thus obtained filtrate was heated and concentrated using an evaporator, and then cooled. Thereafter, the resulting concentrated solution was filtered through a 1.2 μm membrane filter "Minisart" (tradename) available from Sartorius Inc., and conditioned with ion-exchanged water, thereby obtaining a suspension of anionic polymer particles [solid (effective ingredient) content: 42%; average particle diameter: 150 nm].

Example II-1

Production of Cationic Polymer Particles-Incorporating Mesoporous Silica Particles A 100 mL flask was charged with 60 g of water, 20 g of methanol, 0.46 g of a 1M sodium hydroxide aqueous solution, 0.35 g of dodecyltrimethyl ammonium bromide and 0.11 g of the suspension of the cationic polymer particles obtained in Production Example II-1, and the contents of the flask were mixed with each other under stirring. Into the thus obtained aqueous solution was slowly added 0.34 g of tetramethoxysilane, and the resulting mixture was stirred for 5 h and then aged for 12 h. The obtained white precipitate was separated by filtration from the mixture, washed with water and then dried. The resulting dried particles were dispersed in 100 mL of water, and the dispersion was treated with 1M hydrochloric acid to control a pH thereof to 2, and then stirred over night. The obtained white precipitate was separated by filtration from the dispersion, washed with water and then dried, thereby obtaining composite silica particles incorporating the cationic polymer particles therein and having an outer shell portion of a mesoporous structure.

Figure 5:
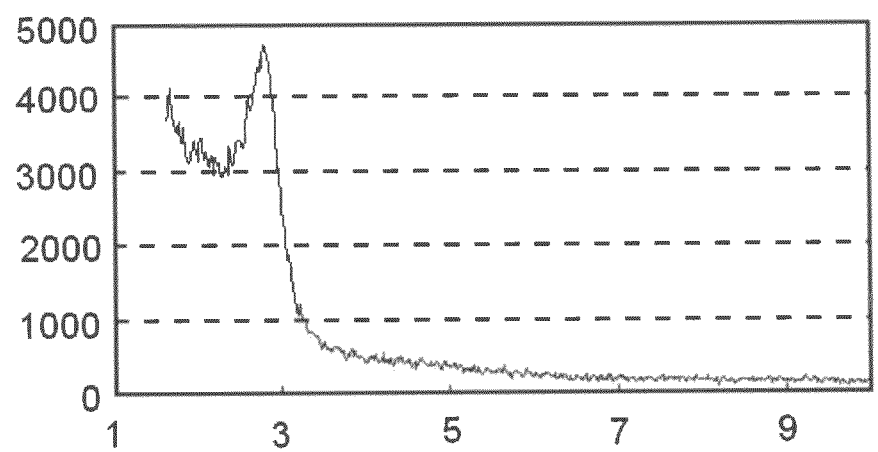
FIG. 5 shows results of XRD measurement of composite silica particles obtained in Example II-1.

From the powder X-ray diffraction (XRD) pattern of the thus obtained composite silica particles, it was confirmed that one or more peaks were observed at a diffraction angle corresponding to the range of d=2 to 12 nm. The results of XRD measurement of the obtained composite silica particles are shown in FIG. 5, and properties of the composite silica particles are shown in Table II-1.

Example II-2

Production of Nonionic Polymer Particles-Incorporating Mesoporous Silica Particles The same procedure as in Example II-1 was repeated except for using 0.19 g of the suspension of the nonionic polymer particles obtained in Production Example II-2 in place of the suspension of the cationic polymer particles, thereby obtaining composite silica particles. The properties of the thus obtained composite silica particles are shown in Table II-1.

Comparative Example II-1

Production of Anionic Polymer Particles-Incorporating Mesoporous Silica Particles The same procedure as in Example II-1 was repeated except for using 0.12 g of the suspension of the anionic polymer particles obtained in Production Example II-3 in place of the suspension of the cationic polymer particles, thereby obtaining composite silica particles. As a result, it was confirmed that the obtained particles were in the form of a group of particles containing silica particles and the polymer. The properties of the thus obtained group of particles are shown in Table II-1.

TABLE II-1

|  | Example II-1 | Example II-2 | Comparative Example II-1 |
| --- | --- | --- | --- |
| Average particle diameter (μm) | 0.34 | 0.03 | 0.15 |
| Content of particles having a particle diameter falling within ±30% of average particle diameter (% by mass) | 100 | 100 | 100 |
| BET specific surface area (m²/g) | 679 | 649 | 243 |
| Average pore size of mesopores (nm) | 1.69 | 1.67 | 1.75 |
| Thickness of outer shell portion (nm) | 55 | 5 | — |
| Ratio of (thickness of outer shell portion)/(average particle diameter) | 0.16 | 0.16 | — |
| Content of mesopores having a pore size falling within ±30% of average pore size (%) | 82 | 82 | 81 |

Example II-3

Production of Hollow Silica Particles

A 100 mL flask was charged with 60 g of water, 20 g of methanol, 0.46 g of a 1M sodium hydroxide aqueous solution, 0.35 g of dodecyltrimethyl ammonium bromide and 0.11 g of the suspension of the cationic polymer particles, and the contents of the flask were mixed with each other under stirring. Into the thus obtained aqueous solution was slowly added 0.34 g of tetramethoxysilane, and the resulting mixture was stirred for 5 h and then aged for 12 h. The obtained white precipitate was separated by filtration from the mixture, washed with water and then dried. The resulting dried particles were heated to 600° C. at a temperature rise rate of 1° C./min and then baked at 600° C. for 2 h to remove the cationic polymer particles therefrom, thereby obtaining hollow silica particles having an outer shell portion of a mesoporous structure.

Figure 6:
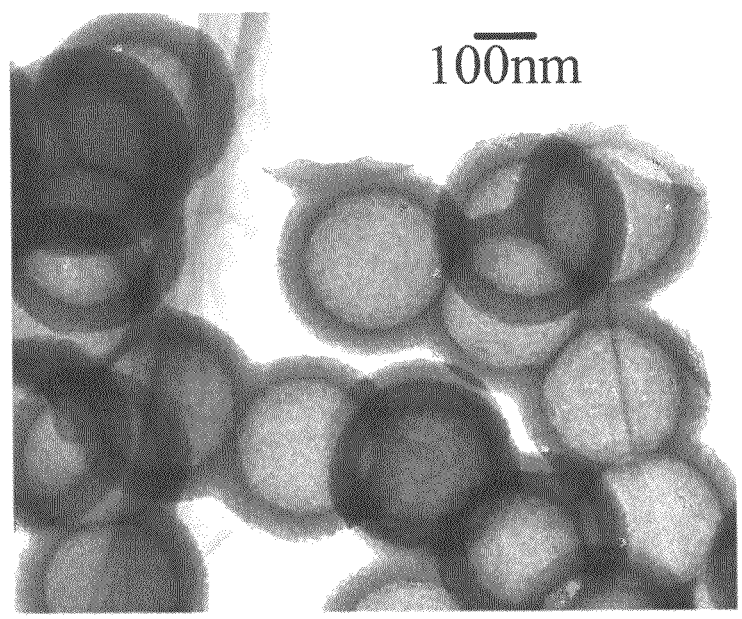
FIG. 6 is a TEM image showing an entire part of the hollow silica particles obtained in Example II-3.
Figure 7:
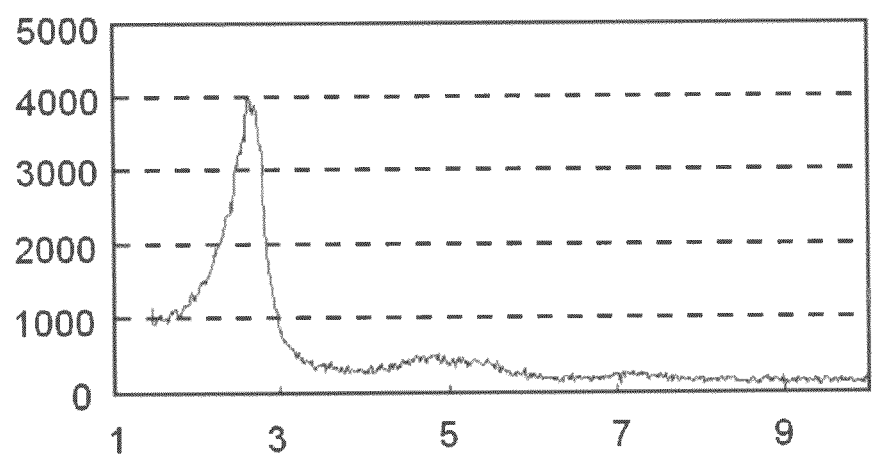
FIG. 7 shows results of XRD measurement of hollow silica particles obtained in Example II-3.

From the powder X-ray diffraction (XRD) pattern of the thus obtained hollow silica particles, it was confirmed that one or more peaks were observed at a diffraction angle corresponding to the range of d=2 to 12 nm. The TEM image of an entire part of the obtained hollow silica particle is shown in FIG. 6, the results of XRD measurement thereof are shown in FIG. 7, and properties of the hollow silica particles are shown in Table II-2.

Example II-4

Production of Hollow Silica Particles

The cationic polymer particles-incorporating mesoporous silica particles obtained in Example II-1 were heated to 600° C. at a temperature rise rate of 1° C./min and then baked at 600° C. for 2 h to remove the cationic polymer particles therefrom, thereby obtaining hollow silica particles having an outer shell portion of a mesoporous structure. The properties of the thus obtained hollow silica particles are shown in Table II-2.

Meanwhile, from the powder X-ray diffraction (XRD) pattern of the thus obtained hollow silica particles, it was confirmed that one or more peaks were observed at a diffraction angle corresponding to the range of d=2 to 12 nm.

Comparative Example II-2

The same procedure as in Example II-4 was repeated except for using no suspension of the cationic polymer particles. As a result, it was confirmed that no hollow particles were produced. The results of Comparative Example II-2 together with the results of Comparative Example I-2 are shown in Table II-2.

TABLE II-2

|  | Example II-3 | Example II-4 | Comparative Example II-1 | Comparative Example I-2 |
| --- | --- | --- | --- | --- |
| Average particle diameter (μm) | 0.34 | 0.34 | 0.65 | 40 |
| Content of particles having a particle diameter falling within ±30% of average particle diameter (% by mass) | 100 | 100 | 100 | 100 |
| BET specific surface area (m²/g) | 1176 | 1087 | 1333 | 0.41 |
| Average pore size of mesopores (nm) | 1.42 | 1.73 | 1.50 | — |
| Thickness of outer shell portion (nm) | 55 | 55 | — | 1000 |
| Ratio of (thickness of outer shell portion)/(average particle diameter) | 0.16 | 0.16 | — | 0.025 |
| Content of mesopores having a pore size falling within ±30% of average pore size (%) | 85 | 81 | 82 | — |

Example III-1

A 100 mL flask was charged with 60 g of water, 20 g of methanol, 0.46 g of a 1N sodium hydroxide aqueous solution and 0.35 g of dodecyltrimethyl ammonium bromide, and the contents of the flask were mixed with each other under stirring. Into the thus obtained aqueous solution was slowly added a mixture of 0.17 g of tetramethoxysilane and 0.15 g of bistriethoxysilyl ethane, and the resulting mixture was stirred for 5 h and then aged for 12 h. The obtained white precipitate was separated by filtration from the mixture, washed with water and then dried. The resulting dried particles were baked while heating up to 500° C. at a temperature rise rate of 1° C./min.

The properties of the thus obtained hollow silica particles having an outer shell portion of a mesoporous structure are shown in Table III-1. Meanwhile, from the powder X-ray diffraction (XRD) pattern of the thus obtained hollow silica particles, it was confirmed that one peak was observed at a diffraction angle corresponding to the range of d=2 to 12 nm.

Comparative Example III-1

A 100 mL flask was charged with 60 g of water, 20 g of methanol, 0.46 g of a 1M sodium hydroxide aqueous solution and 0.35 g of dodecyltrimethyl ammonium bromide, and the contents of the flask were mixed with each other under stirring. Into the thus obtained aqueous solution was slowly added 0.35 g of tetramethoxysilane, and the resulting mixture was stirred for 5 h and then aged for 12 h. The obtained white precipitate was baked in the same manner as in Example III-1. The results are shown in Table III-1.

Comparative Example III-2

A 100 mL flask was charged with 60 g of water, 20 g of methanol, 0.46 g of a 1M sodium hydroxide aqueous solution and 0.35 g of dodecyltrimethyl ammonium bromide, and the contents of the flask were mixed with each other under stirring. Into the thus obtained aqueous solution was slowly added 0.4 g of bistriethoxysilyl ethane, and the resulting mixture was stirred for 5 h and then aged for 12 h. The obtained white precipitate was baked in the same manner as in Example III-1. The results are shown in Table III-1.

TABLE III-1

| | Example III-1 | Comparative Example III-1 | Comparative Example III-2 |
|---|---|---|---|
| Average particle diameter (μm) | 0.7 | 0.7 | 0.7 |
| Content of particles having a particle diameter falling within ±30% of average particle diameter (% by mass) | 100 | 100 | 100 |
| BET specific surface area ($m^2/g$) | 1245 | 1010 | 4 |
| Average pore size of mesopores (nm) | 1.6 | 1.5 | None |
| Thickness of outer shell portion (nm) | 150 | — | — |
| Ratio of (thickness of outer shell portion)/(average particle diameter) | 0.2 | — | — |
| Content of hollow particles (% by mass) | 100 | 0 | 0 |
| $^{13}$C-NMR peak (ppm) | 5 | — | — |

Example III-2

The same procedure as in Example III-1 was repeated except for using 0.15 g of bistriethoxysilyl methane in place of bistriethoxysilyl ethane used in Example III-1, thereby obtaining hollow silica particles. As a result, it was confirmed that the obtained silica particles were hollow silica particles similar to those obtained Example III-1 except that the organic group contained therein was a methylene group. The results of the measurement are shown in Table III-2.

Example III-3

The same procedure as in Example III-1 was repeated except for using 0.13 g of dimethyldimethoxysilane in place of bistriethoxysilyl ethane used in Example III-1, thereby obtaining hollow silica particles. As a result, it was confirmed that the content of hollow particles in the obtained silica particles was as low as 10% by mass or less, but the obtained hollow particles were hollow mesoporous silica particles having an outer shell portion of a mesoporous structure. The results of the measurement are shown in Table III-2.

TABLE III-2

| | Example III-2 | Example III-3 |
|---|---|---|
| Average particle diameter (μm) | 0.7 | 0.7 |
| Content of particles having a particle diameter falling within ±30% of average particle diameter (% by mass) | 100 | 100 |
| BET specific surface area ($m^2/g$) | 917 | 1117 |
| Average pore size of mesopores (nm) | 1.4 | 1.3 |
| Thickness of outer shell portion (nm) | 150 | 150 |
| Ratio of (thickness of outer shell portion)/(average particle diameter) | 0.2 | 0.2 |
| Content of hollow particles (% by mass) | 100 | >10 |

The hollow silica particles obtained in Examples III-1 to III-3 all had an outer shell portion of a mesoporous structure which is constituted of a silicon compound containing an organic group and includes mesopores having an average pore size of from 1 to 10 nm.

INDUSTRIAL APPLICABILITY

In accordance with the present invention, there are provided hollow silica particles having an outer shell portion of a mesoporous structure, composite silica particles having an outer shell portion of a mesoporous structure in which a hydrophobic organic compound or a polymeric organic compound is incorporated, and a process for producing the hollow silica particles.

The composite silica particles of the present invention (Examples I-1 and I-2, and Examples II-1 and II-2) and the hollow silica particles of the present invention (Examples I-3 and I-4, Examples II-3 and II-4 and Examples III-1 to III-3) can be used, for example, in applications requiring a structural selectivity such as a catalyst carrier, an adsorbent, a separator for various materials, and an immobilizing carrier for enzymes or functional organic compounds because of mesoporous structure and large specific surface area thereof, and exhibit a good utilization because they are easily controlled in materials to be incorporated therein.

The composite silica particles of the present invention are capable of selectively adsorbing ions, for example, by incorporating an ion-exchanged resin therein. In addition, optical properties of polymer particles can be modified by coating the surface of the respective polymer particles with the mesoporous silica as a low-refractive material to thereby improve a transparency and a chromaticity thereof. Also, when synthesizing the composite silica particles using a microcapsule made of a polymer, it is possible to incorporate therein a functional material contained in the microcapsule and thereby apply the particles as a controlled release material or a catalyst. Further, when producing composite silica particles including a polymer physically or chemically incorporated with a metal catalyst, etc., and then baking the composite silica particles to remove the polymer therefrom, it is possible to obtain mesoporous silica particles of a bell shape having a hollow portion incorporated with the catalyst solely. The thus obtained compound is capable of being subjected to selective reactions. As described above, it can be expected that the composite silica particles of the present invention are used in very extensive applications.

The hollow silica particles inside of which a functional organic compound is incorporated can be very effectively applied to drug delivery systems, etc.

In addition, according to the production process of the present invention, it is possible to efficiently produce composite silica particles as well as hollow silica particles which have a mesoporous structure and incorporate an organic compound therein. Further, according to the production process, it is possible to easily control a particle diameter of the obtained particles, thereby enabling production of particles having a high mesoporous regularity and a uniform specific surface area.

The hollow silica particles of the present invention (Examples III-1 to III-3) had an outer shell portion of a mesoporous structure, were constituted of the silicon compound containing an organic group, and exhibited a good lipophilic property. Therefore, the hollow silica particles can be used, for example, in applications requiring a structural selectivity such as a catalyst carrier, an adsorbent, a separating agent for various materials, and an immobilizing carrier for enzymes or functional organic compounds.

The invention claimed is:

1. Hollow silica particles comprising an outer shell portion having a mesoporous structure with an average pore size of from 1 to 10 nm, wherein the silica particles have an average particle diameter of from 0.64-10 μm, and 80% or more of the whole silica particles have a particle diameter falling within the range of ±30% of the average particle diameter, wherein an average thickness of the outer shell portion of the hollow silica particles is from 70 to 400 nm, and wherein a ratio of the thickness of the outer shell portion of the hollow silica particles to an average particle diameter is from 0.01 to 0.4.

2. The hollow silica particles of claim 1, wherein the silica particles have a BET specific surface of 800 m$^2$/g or more.

3. The hollow silica particles of claim 1, wherein the hollow silica particles exhibit a powder X-ray diffraction pattern in which one or more peaks are observed at a diffraction angle corresponding to a range of d=2 to 12 nm.

4. The hollow silica particles of claim 1, wherein the outer shell portion is produced from at least one silicon compound comprising at least one organic group.

5. The hollow silica particles of claim 1, wherein the structure of the outer shell portion of the hollow silica particles is formed from at least one silica source selected from the group consisting of compounds represented by the following formulas (4), (5), (6), and (7):

  (4);

  (5);

  (6); and

  (7), wherein $R^3$ groups are each independently an organic group having a carbon atom directly bonded to a silicon atom; $R^4$ is a hydrocarbon group having 1 to 4 carbon atoms or a phenylene group; and Y is a monovalent hydrolysable group which can be hydrolyzed into a hydroxyl group.

6. The hollow silica particles of claim 1, wherein the hollow silica particles have a BET specific surface of 900 m$^2$/g or more.

7. The hollow silica particles of claim 1, wherein the average pore size of the mesoporous structure is from 1 to 5 nm.

8. The hollow silica particles of claim 1, wherein the average pore size of the mesoporous structure is from 1 to 8 nm.

9. The hollow silica particles of claim 1, wherein the hollow silica particles have a BET specific surface of from 950 to 1500 m$^2$/g or more.

10. The hollow silica particles of claim 1, wherein a ratio of the thickness of the outer shell portion of the hollow silica particles to the average particle diameter is from 0.05 to 0.4.

11. The hollow silica particles of claim 1, wherein a ratio of the thickness of the outer shell portion of the hollow silica particles to the average particle diameter is from 0.1 to 0.4.

* * * * *